United States Patent
de la Broise et al.

(10) Patent No.: US 9,002,282 B1
(45) Date of Patent: Apr. 7, 2015

(54) METHOD AND APPARATUS FOR PRIORITY BASED COEXISTENCE ARBITRATION

(71) Applicant: Marvell International Ltd., Hamilton (BM)

(72) Inventors: Josselin de la Broise, Palo Alto, CA (US); Li-Fu Jeng, San Jose, CA (US); Deepak Jain, San Ramon, CA (US); Rajesh Juluri, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 236 days.

(21) Appl. No.: 13/715,127

(22) Filed: Dec. 14, 2012

Related U.S. Application Data

(60) Provisional application No. 61/576,297, filed on Dec. 15, 2011, provisional application No. 61/578,199, filed on Dec. 20, 2011, provisional application No. 61/578,200, filed on Dec. 20, 2011, provisional application No. 61/694,654, filed on Aug. 29, 2012.

(51) Int. Cl.
| | |
|---|---|
| *H04B 1/00* | (2006.01) |
| *H04B 15/00* | (2006.01) |
| *H04M 1/00* | (2006.01) |
| *H04B 1/40* | (2006.01) |

(52) U.S. Cl.
CPC .......................................... *H04B 1/40* (2013.01)

(58) Field of Classification Search
USPC .............. 455/443, 435.3, 448, 500, 501, 512, 455/63.1, 67.13, 71, 553.1; 375/144, 148
See application file for complete search history.

(56) References Cited

U.S. PATENT DOCUMENTS

| | | | |
|---|---|---|---|
| 8,804,624 B1 * | 8/2014 | Lee et al. ....................... 370/328 |
| 2004/0192222 A1 * | 9/2004 | Vaisanen et al. ................ 455/78 |
| 2005/0271010 A1 * | 12/2005 | Capretta ....................... 370/329 |
| 2008/0238807 A1 * | 10/2008 | Ibrahim et al. ................ 343/876 |
| 2009/0116437 A1 * | 5/2009 | Alexandre et al. ............ 370/329 |
| 2009/0257379 A1 * | 10/2009 | Robinson et al. ............. 370/329 |
| 2009/0258607 A1 * | 10/2009 | Beninghaus et al. ........... 455/77 |
| 2010/0202416 A1 * | 8/2010 | Wilhelmsson et al. ....... 370/336 |
| 2011/0026512 A1 * | 2/2011 | Wenham et al. .............. 370/345 |
| 2011/0134746 A1 | 6/2011 | Liu et al. |
| 2012/0046000 A1 * | 2/2012 | Gao et al. ........................ 455/73 |
| 2012/0236736 A1 * | 9/2012 | Frank et al. ................... 370/252 |

* cited by examiner

*Primary Examiner* — Andrew Wendell

(57) ABSTRACT

A coexistence system including a first transceiver module in a first network device, generating a first request signal that requests transmission or reception for the first transceiver module, and operating according to a first wireless communication standard. An interface, based on the first request signal, generates a first priority signal, which indicates a first priority level of first data signals. A second transceiver module is in the first network device and generates a second request and priority signals. The second transceiver module operates according to a second wireless communication standard. The second request signal requests transmission or reception for the first transceiver module. The second priority signal indicates a second priority level of second data signals. An arbitration module (i) based on the first and second priority levels, arbitrates the first and second request signals, and (ii) based thereon, selectively connects antennas to the first and second transceiver modules.

20 Claims, 23 Drawing Sheets

|  | First Trans. | Second Trans. | Third Trans. |
|---|---|---|---|
| First Trans. | 2x2 (First Trans.Only) | First – 1x1 Second – 1x1 | First – 1x1 Third – 2x2 |
| Second Trans. |  | 2X2 (Second Trans. Only) | Second – 1x1 Third – 1x1 |
| Third Trans. |  |  | 1x1 (Third Trans. Only) |

FIG. 2

|  | First Trans. | Second Trans. | Third Trans. |
|---|---|---|---|
| First Trans. | 3 Ants. | None | None |
| Second Trans. | None | 3 Ants. | None |
| Third Trans. | None | None | 1 Ant. |
| First and Second Trans. | 2 Ants. | 1 Ant. | None |
| First and Third Trans. | 2 Ants. | None | 1 Ant |
| Second and Third Trans. | None | 2 Ants. | 1 Ant |
| First, Second and Third Trans. | 1 Ant | 1 Ant | 1 Ant |

FIG. 3

| | | First Trans. | | | Second Trans. | | | | Third Trans. | | |
|---|---|---|---|---|---|---|---|---|---|---|---|
| | | TX | RX | Idle | TX | RX | RX-Idle | Idle | TX | RX | Idle |
| First Trans. | TX | 2,2 or 1,1 – First Trans. | | | 1,1 | 1,1 | 1,1 | 2,0 | 1,1 | 1,1 | 2,0 |
| | RX | | | | 1,1 | 2,2 or 1,1 | 2,2 or 1,1 | 2,0 | 1,1 | 2,2 or 1,1 | 2,0 |
| | Idle | | | | 0,2 | 0,2 | 0,2 | 1,1 | 0,2 | 0,2 | 1,1 |
| Second Trans. | TX | | | | 2,2 or 1,1 – First Trans. | | | | 1,1 | 1,1 | 2,0 |
| | RX | | | | | | | | 1,1 | 2,2 or 1,1 | 2,0 |
| | Rx-Idle | | | | | | | | 1,1 | 2,2 or 1,1 | 2,0 |
| | Idle | | | | | | | | 0,2 | 0,2 | 1,1 |
| Third Trans. | TX/RX | | | | | | | | 2,2 or 1,1 – Third Trans. | | |

FIG. 5

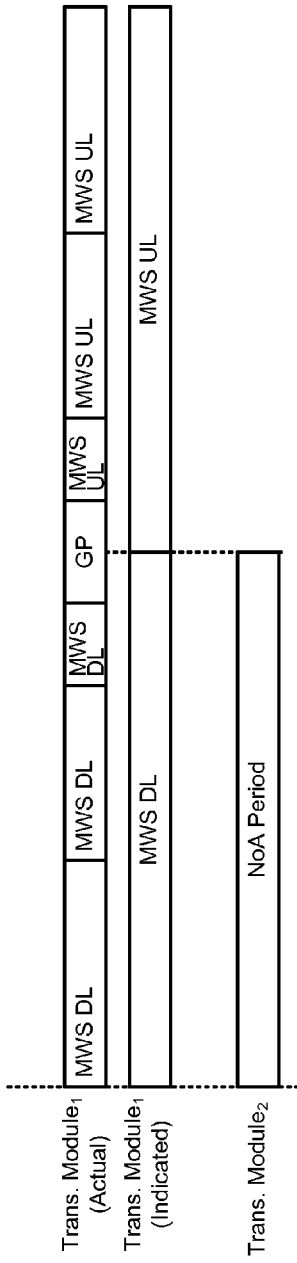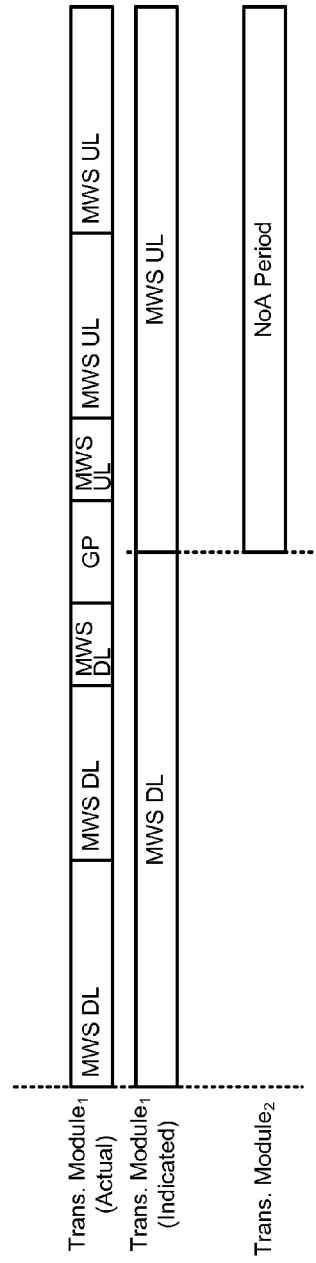
FIG. 8A
FIG. 8B

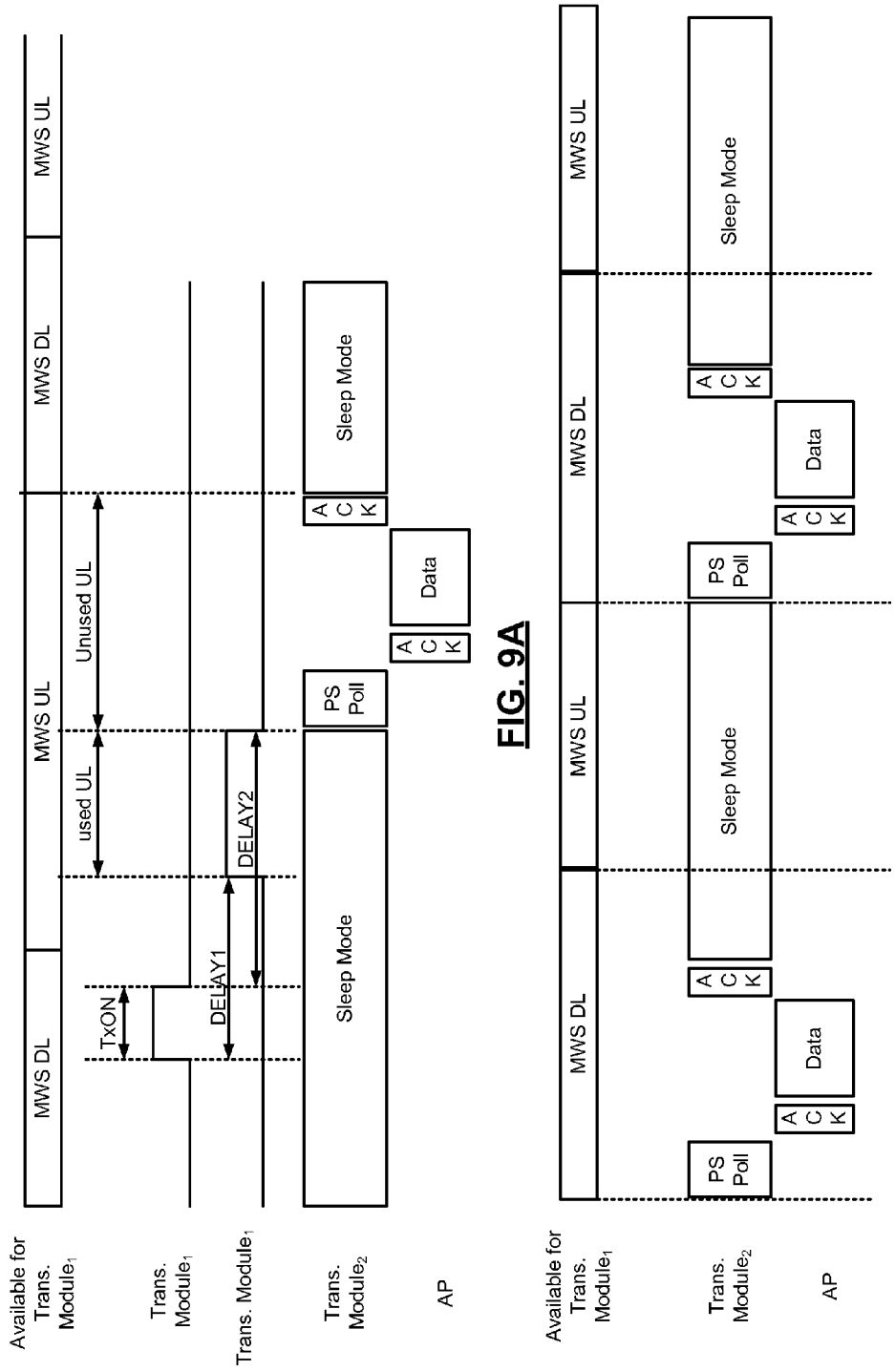

| Priority Level | First Trans. | Second Trans. | Third Trans. |
|---|---|---|---|
| High | First Trans. Connection Establishment Signals | | Connection Establishment and Role Switch Signals |
| Medium High | User Data and High Priority Scan Data | Second Trans. ACK and Beacon Signals | Audio Data |
| Medium | | PS Poll, RTS, and CTS signals and QOS Data | Audio Retransmissions Signals, Inquiry data and Paging Data |
| Low | Background Scan Data | Association and Authentication Data | User Data and Broadcast Data |

FIG. 13

METHOD AND APPARATUS FOR PRIORITY BASED COEXISTENCE ARBITRATION

CROSS-REFERENCE TO RELATED APPLICATIONS

This present disclosure claims the benefit of U.S. Provisional Application No. 61/694,654, filed on Aug. 29, 2012, U.S. Provisional Application No. 61/578,200, filed on Dec. 20, 2011, U.S. Provisional Application No. 61/578,199, filed on Dec. 20, 2011, and U.S. Provisional Application No. 61/576,297, filed on Dec. 15, 2011. The entire disclosures of the applications referenced above are incorporated herein by reference.

The present disclosure is related to U.S. Non-provisional application Ser. No. 13/715,023, filed concurrently herewith on Dec. 14, 2012, and U.S. Non-provisional application Ser. No. 13/715,253, filed concurrently herewith on Dec. 14, 2012.

FIELD

The present disclosure relates to wireless communication and wireless networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Stations of a network can directly communicate with each other while operating in an ad hoc mode, or indirectly communicate with each other—via an access point (AP)—while operating in an infrastructure mode. Each of the stations can be a desktop computer, a personal digital assistant (PDA), a mobile phone, a laptop, a personal computer (PC), a printer, a digital camera, an Internet protocol (IP) phone, etc. Each of the stations typically includes a host device and a wireless network interface, in which the host device transmits and receives signals via the wireless network interface.

A wireless network interface of a station can be compatible with one or more wireless communication standards, such as Long Term Evolution (LTE), Worldwide Interoperability for Microwave Access (WiMAX), Bluetooth (BT), Wi-Fi, and wireless local area network (WLAN). Each of the communication standards can be have respective frequency operating bands. The frequency operating bands can overlap and/or be adjacent to (or sequentially after) each other.

A wireless network interface can include one or more receivers. A receiver can be susceptible to desensitization, which degrades operation of the receiver. Desensitization occurs when a first signal "drowns out" a second signal (or signal of interest). A first signal desensitizes the second signal. This occurs when signals are transmitted in the same or adjacent frequency bands. Although filters can be used to filter out noise and/or signals outside of a frequency band of interest, the ability of the filters to prevent desensitization due to signals transmitted in the frequency band of interest and/or in adjacent frequency bands is limited.

SUMMARY

A coexistence system is provided and includes a first transceiver module, an interface, a second transceiver module, and an arbitration module. The first transceiver module, in a first network device, is configured to generate at least one first request signal. The first transceiver module operates according to a first wireless communication standard. The at least one first request signal requests transmission or reception for the first transceiver module. The interface is configured to generate a first priority signal based on the at least one first request signal. The first priority signal indicates a first priority level of first data signals corresponding to the at least one first request signal. The second transceiver module, in the first network device, is configured to (i) generate at least one second request signal, and (ii) generate a second priority signal. The second transceiver module operates according to a second wireless communication standard. The at least one second request signal requests transmission or reception for the first transceiver module. The second priority signal indicates a second priority level of second data signals corresponding to the at least one second request signal. The arbitration module is configured to (i) based on the first priority level and the second priority level, arbitrate the at least one first request signal and the at least one second request signal, and (ii) based on the arbitration of the at least one first request signal and the at least one second request signal, selectively connect antennas to the first transceiver module and the second transceiver module in one of multiple configurations.

In other features, a method is provided and includes generating at least one first request signal via a first transceiver module in a network device. The first transceiver module operates according to a first wireless communication standard. The at least one first request signal requests transmission or reception for the first transceiver module. A first priority signal is generated via an interface based on the at least one first request signal. The first priority signal indicates a first priority level of first data signals corresponding to the at least one first request signal. At least one second request signal and a second priority signal are generated via a second transceiver module. The second transceiver module is in the network device and operates according to a second wireless communication standard. The at least one second request signal requests transmission or reception for the first transceiver module. The second priority signal indicates a second priority level of second data signals corresponding to the at least one second request signal. Based on the first priority level and the second priority level, the at least one first request signal and the at least one second request signal are arbitrated. Based on the arbitration of the at least one first request signal and the at least one second request signal, antennas to the first transceiver module and the second transceiver module are selectively connected in one of multiple configurations.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 2 is a spatial multiplexing table for a dual antenna setup in accordance with one implementation of the present disclosure.

FIG. 3 is another spatial multiplexing table for a triple antenna setup in accordance with one implementation of the present disclosure.

FIG. 5 is another spatial multiplexing table with transmitter and receiver specific entries in accordance with one implementation of the present disclosure.

FIGS. 8A and 8B are timing diagrams illustrating protection of signals transmitted using a first wireless communication standard in accordance with one implementation of the present disclosure.

FIGS. 9A and 9B are timing diagrams illustrating use of uplink and downlink periods of a first wireless communication standard for scheduled power save triggered signals of another wireless communication standard in accordance with one implementation of the present disclosure.

FIG. 13 is a priority table for signals of multiple wireless communication standards in accordance with one implementation of the present disclosure.

Like reference symbols in the various drawings indicate like elements.

DESCRIPTION

Figure 1:
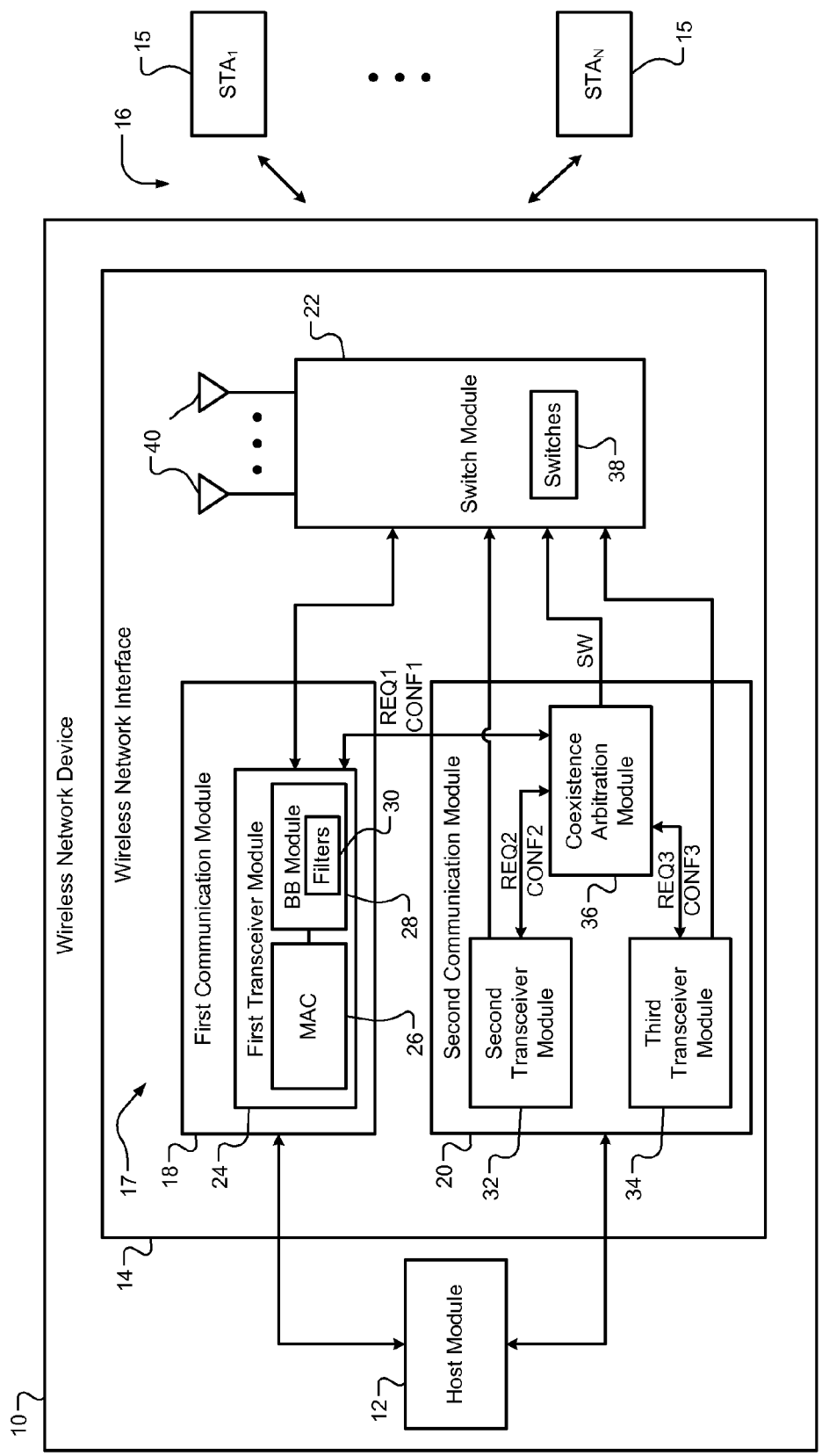
FIG. 1 is a functional block diagram of a wireless network device incorporating a coexistence system in accordance with one implementation of the present disclosure.

FIG. 1 illustrates a wireless network device 10. The wireless network device 10 may be referred to as a station and includes a host module 12 and a wireless network interface 14. The host module 12 may be, for example, a control module or processor of the wireless network device 10. The host module 12 generates signals to be transmitted to one or more stations 15 in a network 16 via the wireless network interface 14 and/or receives signals from the network via the wireless network interface 14.

Figure 6:
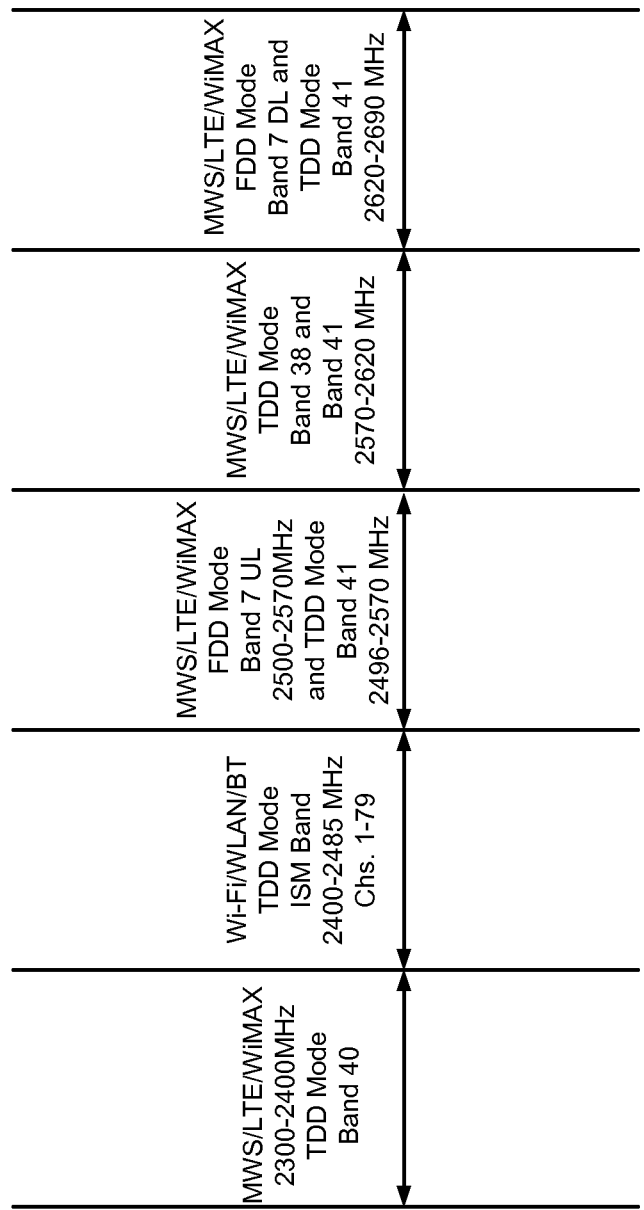
FIG. 6 illustrates frequency ranges for multiple wireless communication standards.

The wireless network interface 14 includes a coexistence system 17 that includes a first communication module 18, a second communication module 20 and a switch module 22. The first communication module 18 includes a first transceiver module 24, which may include a media access control (MAC) module 26 and a baseband module 28. The first transceiver module 24 may (i) transmit signals received from the host module 12 to the switch module 22, and (ii) transfer signals received from the switch module 22 to the host module 12. Transceiver modules disclosed herein may be referred to as transceivers. The baseband module 28 may be referred to as a physical layer (PHY) module. The baseband module 28 may transmit and receive, for example, signals conforming to LTE, WiMAX and/or other mobile wireless standard (MWS) standards. Example frequency channels (or frequency ranges) for MWS are shown in FIG. 6.

The baseband module 28 may include filters 30, such as band reject filters (BRFs), for filtering signals transmitted to and/or received from the switch module 22. The filters 30 can be used to reject signals transmitted and/or received by the second communication module 20 and/or protect against MWS hybrid automatic repeat request (HARQ) transmissions. A MWS HARQ transmission may refer to an acknowledgement (ACK) signal transmitted in response to received data. The ACK signal provides an acknowledgement and does not include data. A MWS HARQ signal may be transmitted by the first transceiver module 24 and/or received by the first transceiver module 24. The filters 30 can aid in preventing HARQ transmissions from interfering with other MWS transmissions and/or transmissions associated with the second communication module 20. The BRFs can be used to protect the transceiver modules 32, 34 from transmissions by the first transceiver module 24 and/or to protect the first transceiver module 24 from transmission by the transceiver modules 32, 34. This includes protecting the transceiver modules 32, 34 against MWS HARQ transmissions.

The second communication module 20 may include a second transceiver module 32, a third transceiver module 34 and a coexistence arbitration module 36. Although the second communication module 20 is shown having a particular number of transceiver modules, second communication module 20 may have any number of transceiver modules. As an example, second communication module 20 may have additional transceiver modules than those shown. The transceiver modules 32, 34 may (i) transmit signals received from the host module 12 to the switch module 22, and (ii) transfer signals received from the switch module 22 to the host module 12. The second transceiver module 32 may transmit and receive signals conforming to, for example, WLAN and/or Wi-Fi standards. The WLAN standards referred to herein may include standards that satisfy IEEE standards 802.11-2012, 802.16-2009, and 802.20-2008. The third transceiver module 34 may transmit and receive signals conforming to, for example, BT standards. An example frequency band for WLAN, Wi-Fi and BT is shown in FIG. 6. A frequency band may include one or more channels.

A channel may include one or more frequencies. Although not shown, each of the transceiver modules 32, 34 may include a MAC module and a PHY module with corresponding filters. The filters may include, for example, bandpass filters (BPFs), which may permit passage of signals transmitted from and/or received by the second communication module 20 while preventing passage of signals transmitted from and/or received by the first communication module 18. The bandpass filters may be used to prevent passage of MWS HARQ transmissions to and from the second communication module 20.

The transceiver modules 24, 32, 34 may be referred to as collocated radios since the transceiver modules 24, 32, 34 are in a single wireless network device. Each of the transceiver modules 24, 32, 34 may operate in a transmit mode, a receive mode, a receive idle mode, and/or a power save (or sleep) mode. While operating in the transmit mode, the transceiver modules are actively transmitting packets to the switch module 22. While operating in the receive mode, the transceiver modules 24, 32, 34 are actively receiving packets via the switch module 22. While operating in the receive idle mode, the transceiver modules 24, 32, 34 are powered and are monitoring a channel for packets. While operating in the receive idle mode, the transceiver modules 24, 32, 34 may not be receiving packets. While operating in the sleep mode, the transceiver modules 24, 32, 34 are power down or are minimally powered (certain elements powered down while other elements are remained powered). One or more receiver elements and/or control elements of the transceiver modules 24, 32, 34 may remain powered to receive packets and/or may be awaken subsequent to predetermined periods of time. The transceiver modules 24, 32, 34 may not be in the same mode, but rather may be in different operating or power save modes.

The coexistence arbitration module 36 may determine allocated transmission and reception times for each of the transceiver modules 24, 32, 34 and may generate a switch control signal SW to control states of switches 38 in the switch module 22. The switch module 22 is connected to two or more antennas 40. The states of the switches 38 dictate which of the transceiver modules 24, 32, 34 are connected to the antennas 40 and are permitted to transmit and/or receive signals via the antennas 40. This allows the antennas 40 to be shared by the transceiver modules 24, 32, 34. Spatial multiplexing and/or time division multiplexing (TDM) may be used to implement the sharing of the antennas 40, as is further described below. Spatial multiplexing allows for maximum throughput, which reduces a number of times signals are retransmitted due to errors. A reduced number of transmitted signals, reduces the number of overall bits transmitted and reduces the associated power consumed. For example, the transceiver modules 24, 32 may share two or more of the antennas 40 using TDM. TDM may be performed on a per frame or packet basis. As an example, antennas 40 may be switched between different ones of the transceiver modules 24, 32, 34 prior to transmitting each frame and/or packet.

As another example, one or more of the antennas 40 may be connected to each of the transceiver modules 24, 32, 34 to allow each of the transceiver modules 24, 32, 34 to receive signals via the switch module 22 during the same period. In one implementation, each of the transceiver modules 24, 32, 34 may be connected to a respective one of the antennas 40 while receiving signals during the same period. In another implementation, two or more of the transceiver modules 24, 32, 34 are connected to and use the same antenna during the same period. In another implementation, one or more of the transceiver modules 24, 32, 34 are each connected to two or more of the antennas 40. The coexistence arbitration module 36 and the switch module 22 provide a configurable multiple input multiple output (MIMO) architecture.

The coexistence arbitration module 36 performs arbitration between transmission and reception requests REQ1, REQ2, REQ3 received from the transceiver modules 24, 32, 34. These requests REQ1, REQ2, REQ3 may be transmitted from the transceiver modules 24, 32, 34 to the coexistence arbitration module 36 via signal lines between the transceiver modules 24, 32, 34 and the coexistence arbitration module 36. The coexistence arbitration module 36 allocates transmission time periods for each of the transceiver modules 24, 32, 34, which may be indicated via respective configuration signals CONF1, CONF2, CONF3 transmitted via the signal lines. Although the coexistence arbitration module 36 is shown as being included in the second communication module 20, the coexistence arbitration module 36 may be external to the second communication module 20 and/or included in the first communication module 18.

The coexistence arbitration module 36 may perform arbitration based on a set of arbitration rules, which may be programmed into the coexistence arbitration module 36 and/or a memory accessible to the coexistence arbitration module 36. Firmware stored in the coexistence arbitration module 36 and/or the memory accessible to the coexistence arbitration module may include the arbitration rules. The arbitration rules may include priority rules and antenna selection rules, examples of which are provided and described below.

The coexistence arbitration module 36, the switch module 22 and the antennas 40 may be used to perform spatial multiplexing and/or time division multiplexing (TDM). Spatial multiplexing refers to the transmitting of data signals in an environment over multiple paths in space. The environment may be, for example, a line-of-sight environment or a rich-scattering environment. A line-of-sight environment refers to an environment where the data signals are transmitted directly between stations without interference from one or more other objects located between the stations. A rich-scattering environment refers to an environment when the data signals transmitted between stations and are reflected off of one or more objects between the stations. In a rich-scattering environment there is no direct "line-of-sight" between the antennas of the stations. The encoded data signals, or streams, are transmitted over parallel paths and from each of multiple antennas. The space dimension is reused or multiplexed more than one time. Bits of a data stream are multiplexed over multiple antennas. An increase in spatial multiplexing refers to an increase in the number of parallel streams that can be transmitted. Spatial multiplexing may include transmitting different symbols of a symbol sequence over different antennas TDM refers to the multiplexing of multiple transmit signals and/or receive signals in time using one or more antennas. The transmit signals and the receive signals may satisfy one or more of the stated wireless communication standards.

Two or more antennas may be used to increase transmission range and throughput of one of the transceiver modules 24, 32, 34. The transmission range is increased by increased power of transmit signals due to the use of two or more antennas, as opposed to transmission from a single antenna. The same signals transmitted using a single wireless communication standard may be transmitted from multiple antennas thereby increasing the power of the signals. The transmission range may also be increased by using maximum ratio combining (MRC) for received signals. MRC provides enhanced link reliability. Throughput may be increased via a MIMO architecture, as provided in FIG. 1. This includes transmitting signals via multiple antennas using one or more of the above mentioned wireless communication standards.

The transceiver modules 24, 32 may be used to access the Internet. Two or more of the antennas may be connected to the first transceiver module 24 and the second transceiver module 32 using TDM. In one implementation and when both of the transceiver modules 24, 32 are active, the first transceiver module 24 may be connected to a first one of the antennas 40 while the second transceiver module 32 may be connected to a second one of the antennas 40. This may occur, for example, during access point (AP) discovery by the wireless network device 10 and/or during a handover of the wireless network device 10 between APs. In another implementation, one of the transceiver modules 24, 32 may be in a sleep mode while the other one of the transceiver modules 24, 32 is in an active mode. The active one of the transceiver modules 24, 32 may use two or more of the antennas 40 while the other one of the transceiver modules 24, 32 is in the sleep mode.

Referring also to FIG. 2, a spatial multiplexing table for a dual antenna setup is shown. The spatial multiplexing table may be used by the coexistence arbitration module 36 as an antenna rule set to follow when allocating selected ones of the antennas to the transceiver modules 24, 32, 34. In the spatial multiplexing table, 2×2 entries indicate that 2 antennas are used for transmit and receive. Each of the antennas may be used for transmission and each of the antennas may be used for reception. As an alternative, one of the antennas may be dedicated for transmission and the other one of the antennas may be dedicated for reception. A 1×1 entry indicates that a single antenna is used for both transmit and receive. The first column and the first row of the spatial multiplexing table identify the transceiver module that is active. Although the spatial multiplexing table is provided for a two antenna implementation, a similar table may be used for implementations having more than two antennas. Use of the spatial multiplexing table may be referred to as static spatial multiplexing technique.

In accordance with the spatial multiplexing table, when only one of the transceiver modules 24, 32, 34 is active, both antennas may be used for transmit and receive for the active transceiver module. When the transceiver modules 32, 34 are active, spatial multiplexing may be used to share the antennas between the transceiver modules 32, 34. This allows each of the transceiver modules 32, 34 to use both of the antennas during allocated time periods.

When the transceiver modules 24, 32 are active, then the first transceiver module 24 may use one of the antennas for transmit and receive and the second transceiver module 32 may use the other one of the antennas for transmit and receive. When the transceiver modules 32, 34 are active, then the second transceiver module 32 may use one of the antennas for transmit and receive and the third transceiver module 34 may use the other one of the antennas for transmit and receive. Although not shown in FIG. 2, when all of the transceiver modules 24, 32, 34 are active, the transceiver modules 32, 34 may share one of the antennas and the first transceiver module 24 may use the other one of the antennas.

Referring now to FIGS. 1 and 3, another spatial multiplexing table for a triple antenna setup is shown. In the spatial multiplexing table, the first column identifies the transceiver module that is active. The $2^{nd}$, $3^{rd}$ and $4^{th}$ columns identify the number of antennas allocated for one of the transceiver modules. For example, the entry of the $2^{nd}$ row and the $2^{nd}$ column indicates that when only the first transceiver module 24 is active, all three of the antennas are allocated for the first transceiver module 24. Although the spatial multiplexing table is provided for a three antenna implementation, a similar table may be used for implementations having two or more antennas.

Based on the spatial multiplexing table, when only one of the transceiver modules 24, 32, 34 is active, the active transceiver module may use all of the antennas. When two or more of the transceiver modules 24, 32, 34 are active, the active transceiver modules may share use of the antennas.

When two or more of the transceiver modules 24, 32, 34 are active, the antennas may be shared and/or allocated as provided in the spatial multiplexing table. The allocation of the antennas may be dynamically changed based on the arbitration rules and/or transmit and receive states of the transceiver modules 24, 32, 34 and the switch module 22.

Figure 4:
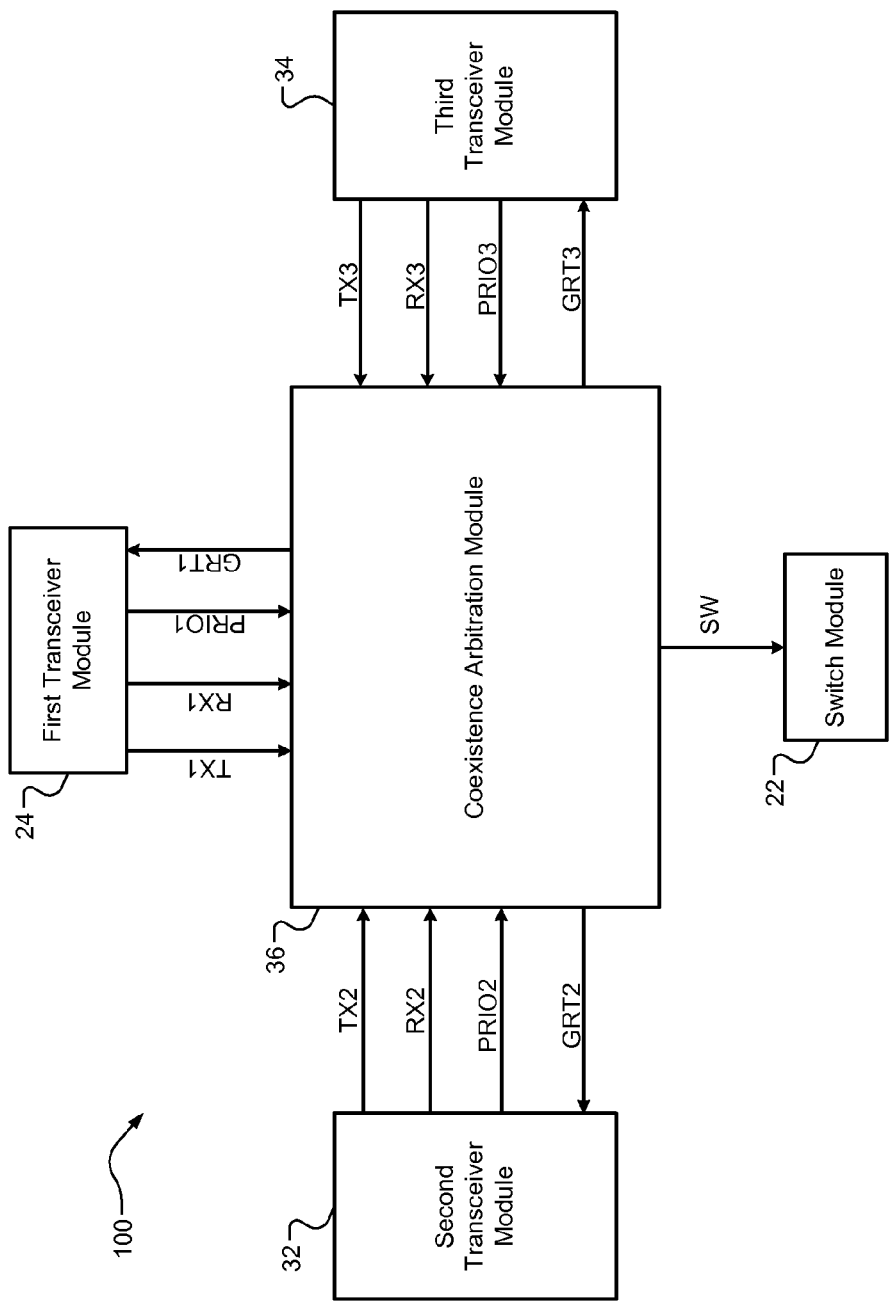
FIG. 4 is a functional block diagram of a portion of the coexistence system of FIG. 1 with priority based arbitration.

In FIG. 4, a portion 100 of the coexistence system of FIG. 1 is shown. In FIG. 4, the transceiver modules 24, 32, 34, the coexistence arbitration module 36 and the switch module 22 are shown. FIG. 4 illustrates at least some of the signals transmitted between the transceiver modules 24, 32, 34 and the coexistence arbitration module 36. Each of the transceiver modules 24, 32, 34 transmits a transmit request signal, a receive request signal, and a priority signal to the coexistence arbitration module 36. The transmit request signals TX1-3, receive request signals RX1-3, and priority signals PRIO2-3 for the transceiver modules 24, 32, 34 are shown. The transmit request signals request transmission of packets from the transceiver modules 24, 32, 34 to the switch module 22. The receive request signals request reception of packets from the switch module 22.

The priority signals indicate a priority level of signals being transmitted to or received from the switch module 22. The priority signals may provide, for example, a 2-bit value or 3-bit value indicating a priority level. The priority signals may indicate a signal type, such as user data, configuration data, connection setup data, association data, authentication data, audio data, scan data, etc. Any priority level may be given to a given signal type. Associations between priority signals and signal types may be programmable. Examples of signal types and associated priority levels are shown in FIG. 13. Each of the priority levels shown in FIG. 13 may have a corresponding value that is indicated via the priority signals.

The coexistence arbitration module 36 may transmit grant signals to the transceiver modules 24, 32, 34 indicating whether transmission or reception of packets is granted. The coexistence arbitration module 36 may transmit grant information of transceiver modules to other modules. For example, grant information of transceiver modules 32, 34 may be sent to the transceiver module 24. The transceiver module 24 may then access selected antennas, transmit and/or receive based on the received grant information for the transceiver modules 32, 34. The coexistence arbitration module 36 generates the grant signals and the switch control signal based on the arbitration rules. Example antenna configurations are shown in FIG. 5, which may be set based on the arbitration rules and/or the grant signals.

In FIG. 5, another spatial multiplexing table is shown with transmitter and receiver specific entries. Although the spatial multiplexing table is for a certain number of antennas, the spatial multiplexing table may be modified for additional antennas. The first and second columns and the first and second rows of the spatial multiplexing table identify the transceiver module and the corresponding mode in which the transceiver module is operating. The remaining entries in the spatial multiplexing table identify a number of antennas allocated for each mode of the corresponding transceiver module. The remaining entries are in a X,Y format, where X identifies the number of antennas allocated for the mode and transceiver module identified for the corresponding row, and Y identifies the number of antennas allocated for the mode and transceiver module identified for the corresponding column. For example, in the 3rd row and the $6^{th}$ column a 1,1 entry is provided. This means when the first transceiver module 24 is in a transmit mode and the second transceiver module 32 is in a transmit mode, one of the antennas 40 is allocated to the first transceiver module 24 and the other one of the antennas 40 is allocated to the second transceiver module 32. Although the spatial multiplexing table is provided for a two antenna implementation, a similar table may be used for implementations having more than two antennas.

Referring now to FIGS. 1 and 6, five example frequency ranges, multiple channels and a band for multiple wireless communication standards are shown. Corresponding operating modes are also shown. The operating modes include a time division duplex (TDD) mode and a frequency division duplex (FDD) mode. The transceiver modules 24, 32, 34 may operate in the TDD mode or FDD mode depending upon the frequency range and/or channel in which signals are being transmitted and/or received.

The first frequency range, referred to as band 40, includes frequencies 2300-2400 mega-hertz (MHz). The second frequency range, referred to as the industrial, scientific and medical (ISM) band, includes frequencies 2400-2483.5 MHz. The ISM band may include multiple channels, such as channels 1-79. The third frequency range includes frequencies 2500-2570 MHz. The fourth frequency range, referred to as band 38, includes frequencies 2570-2620. The fifth frequency range includes frequencies 2620-2690 MHz. The third frequency range, fourth frequency range and the fifth frequency range are collectively referred to as band 41. The third frequency range and the fifth frequency range are collectively referred to as band 7.

The first transceiver module 24 may operate in the first, third, fourth and/or fifth frequency ranges. The transceiver modules 32, 34 may operate in the second frequency range. The transceiver modules 32, 34 may operate in the TDD mode when operating in the first frequency range, second frequency range and fourth frequency range. The first transceiver module 24 may operate in the FDD mode when operating in the third frequency range and the fifth frequency range. Although certain frequency ranges and operating modes are shown in FIG. 6, the transceiver modules 24, 32, 34 may operate in other frequency ranges and/or operating modes. The ISM band is adjacent to band 40 and band 41. Band 38 is adjacent to band 7.

As an example, transmission of MWS signals in bands 7, 38, 40, 41 can desensitize a receiver receiving WLAN and/or BT signals in the ISM band. As another example, transmission of WLAN and/or BT signals in the ISM band can desensitize MWS signals received in one or more of bands 7, 38, 40 and 41. Thus, transmission of WLAN and/or BT signals can desensitize received MWS signals. Bands 7, 38, 40 and 41 are referred to as MWS bands.

Referring again to FIG. 1, TDM, TDD, and FDD coexistence techniques may be used to transmit and/or receive signals using multiple wireless communication standards. These techniques may include transmitting and/or receiving signals using a first one of the wireless communication standards while transmitting and/or receiving signals using another one of the wireless communication standards. This may be based on the filters used, the number of antennas, the states of the switch module, and the bands used by the transceiver modules 24, 32, 34. FIGS. 7-10 provide examples of TDM coexistence when operating in TDD and FDD modes.

The wireless network device 10 may operate as a client (e.g., a mobile phone), a station and/or as an AP. The wireless network device 10 and/or one of the transceiver modules 24, 32, 34 of the wireless network device 10 may be referred to as a local device. A station and/or AP that is in communication with and is remotely located from the wireless network device 10 may be referred to as a remote device. The local device may not have information indicating whether the remote device is to transmit one or more spatial stream signals to the local device. A spatial stream signal may refer to a signal that is transmitted on a particular frequency using a signal antenna. If two spatial stream signals are transmitted, each signal may be transmitted on a different frequency and using different antennas. The local device may transmit a signal to the remote device indicating whether the local device is configured to receive a single spatial stream signal, multiple spatial stream signals, and/or MIMO packets. The local device may transmit a signal indicating a number of spatial stream signals that the local device is configured to receive to the remote device. The local device may indicate to the remote device that the local device is not configured to receive multiple spatial stream signals and/or mimo packets. The local device may transmit multiple spatial stream signals when granted access to two or more antennas (e.g., two or more of the antennas).

Figure 7:
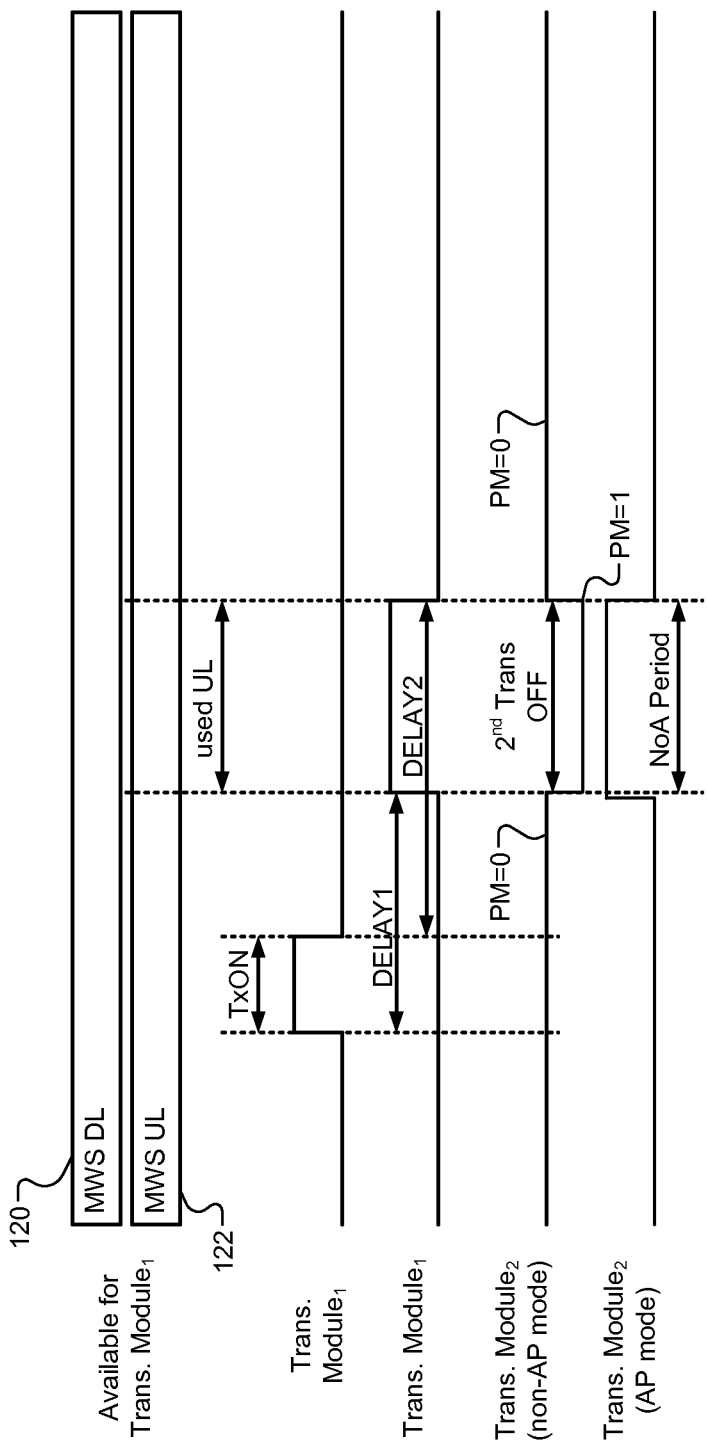
FIG. 7 is a timing diagram illustrating coordinated use of an uplink period of a first wireless communication standard for signals of another wireless communication standard in accordance with one implementation of the present disclosure.

Referring now to FIGS. 1 and 7, a timing diagram illustrating coordinated use of an uplink period of a first wireless communication standard for signals of another wireless communication standard is shown. Although the coexistence technique associated with FIG. 7 is primarily described for the MWS and WLAN (or Wi-Fi) wireless communication standards, the coexistence technique may be used for other wireless communication standards.

Downlink (DL) and uplink (UL) periods 120, 122 available for MWS transmissions are shown. The periods 120, 122 may be of any length and may occur at any time. As an example, the periods 120, 122 may be associated with the LTE FDD (band 7). The DL band is far away from the ISM band, thus desensitization and/or effects on received signals are considered null. The period 120 is shown as an example, and may not be provided. At a given time, UL or DL of MWS transmissions may be performed. In a given period, a pattern of ULs and DLs may be performed. A UL indication signal TxON may be transmitted by the first transceiver module 24 to the second transceiver module 32 to indicate that a MWS signal is to be transmitted within a first predetermined period from the rising or falling edge of the UL indication signal TxON. The second transceiver module 32 may have information received from the first transceiver module 24 and/or the host module 12 indicating that a MWS signal is to be transmitted: within a first predetermined period; and/or finished being transmitted within a second predetermined period. The second predetermined period may begin at the rising or falling edge of the UL indication signal TxON.

Figure 15:
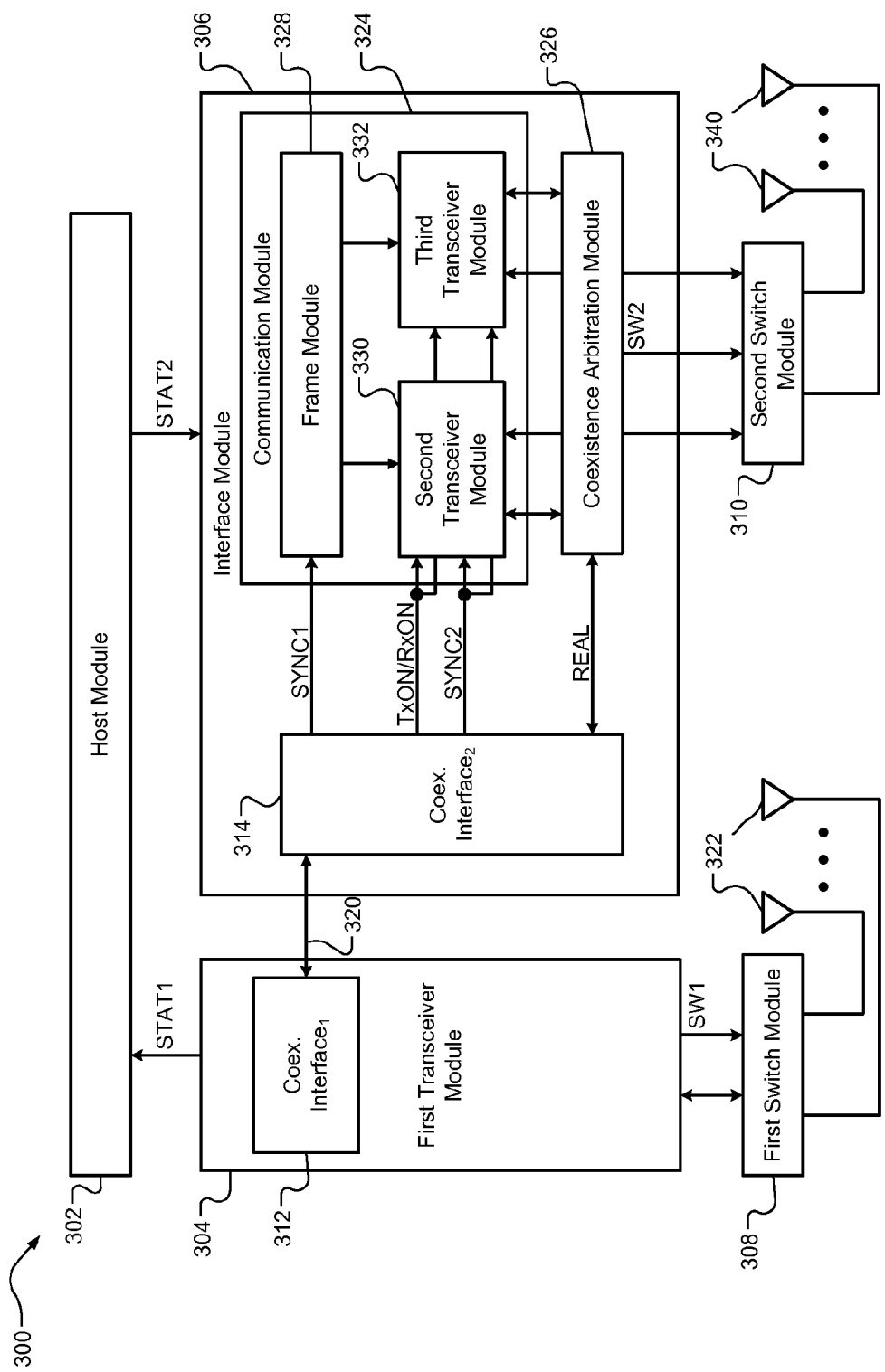
FIG. 15 is a functional block diagram of another coexistence system with dedicated antennas in accordance with one implementation of the present disclosure.

The UL indication signal TxON may be transmitted to the second transceiver module 32 via a coexistence interface (e.g., second coexistence interface in FIG. 15). The time period in which a MWS signal is transmitted is referred to as a used UL period. There may be a delay period DELAY between the pulse of the UL indication signal and the used UL period. WLAN or Bluetooth signals may be transmitted and/or received in an unused portion of the MWS UL period that is not used to transmit MWS signals. The time period that is used for transmitting WLAN signals may be referred to as the unused UL period. The unused UL period may include the portion of the UL period 122 that is not part of the used UL period.

In FIG. 7, signals of the second transceiver module 32 are shown illustrating when the wireless network device 10 is not operating in an AP mode and when the wireless network device 10 is operating in an AP mode. While in the AP mode, the wireless network device 10 is operating as an AP.

While the wireless network device 10 is not operating in the AP mode, the second transceiver module 32 may transition to the power save mode (PM) after detecting the rising edge of the UL indication signal TxON and during the UL used period. The second transceiver module 32 may transition to the power save mode (PM) prior to, at, or subsequent to the beginning of the UL used period. This may occur after a first delay DELAY1. The second transceiver module 32 may indicate to an access point (AP) when the wireless network device (or station) 10 is in the PM mode via a PM signal indicating the same. The second transceiver module 32 may transmit the PM signal and/or other indication signal to the AP. The second transceiver module 32 and/or the wireless network device 10 may be in the PM mode when the PM signal is a 1 and may be in an active mode when the PM signal is a 0. The other indication signal may indicate that a certain channel of a transmission medium is to be used for a MWS UL transmission.

The AP may be referred to as a group owner (GO) and may, in response to the PM signal or other indication signal, send out a notice of absence (NoA) signal to stations in an independent basic serve set (IBSS) and/or network of the AP. The NoA signal may indicate that the channel and/or transmission medium are reserved for MWS transmission and for a NoA period. The NoA signal may be transmitted by the wireless network device 10 when the wireless network device 10 is operating in the AP mode.

Figure 12:
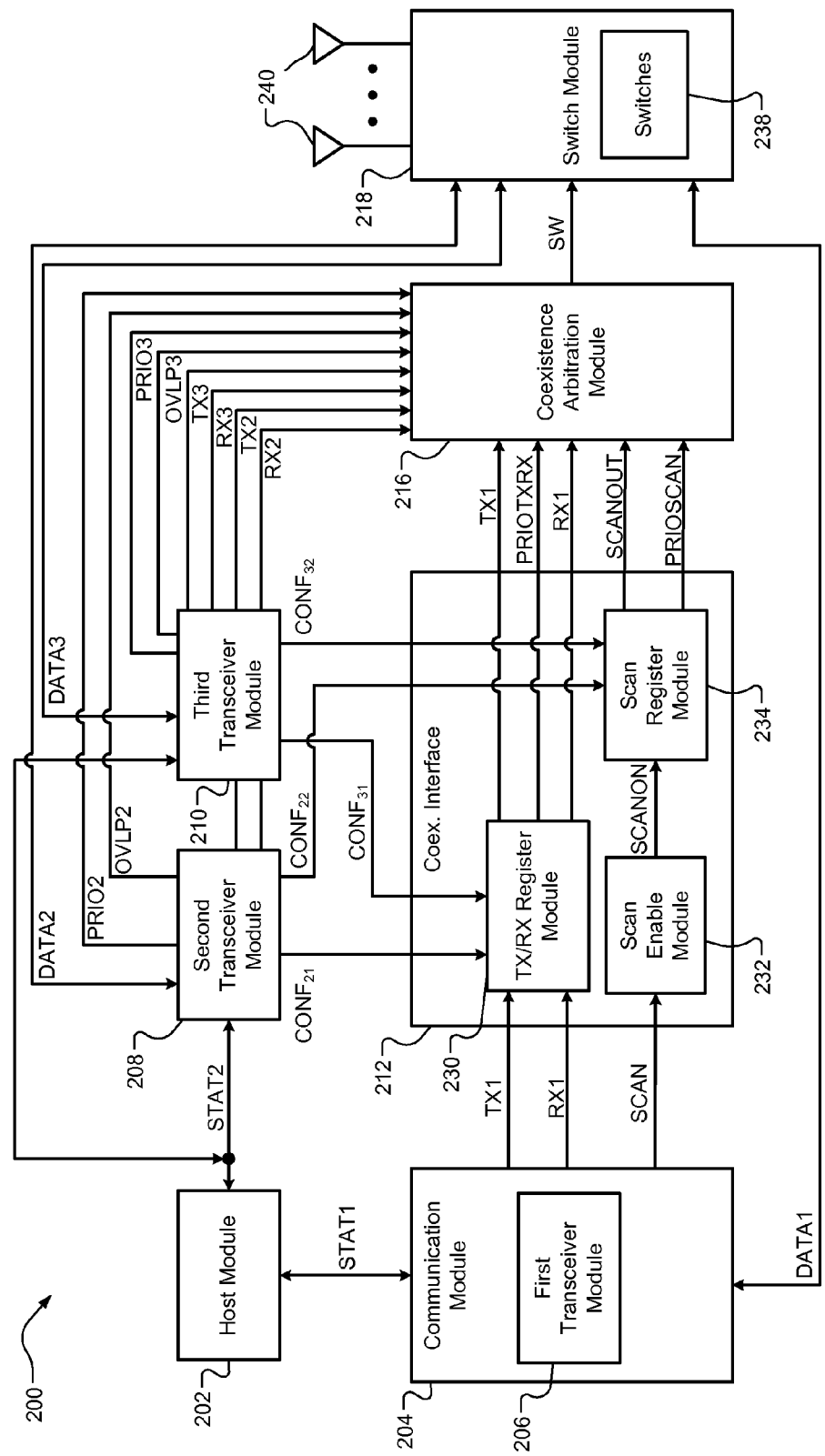
FIG. 12 is a functional block diagram of a coexistence system that performs priority based arbitration in accordance with one implementation of the present disclosure.

The second transceiver module 32 may transition to the active mode (PM=0) at an end of the UL used period. The length of the UL used period may be indicated to the second transceiver module 32. The first transceiver module 24 may transmit a status signal to the second transceiver module 32 indicating lengths of UL periods, DL periods, and/or UL used periods. The status signal may be provided via the host module 12. Example status signals are shown in FIGS. 12 and 15. The end of the UL used period may be a predetermined amount of time from the rising and/or falling edges of the UL indication signal. As an example, the end of the UL used period may be a second delay DELAY2 from the rising edge of the UL indication signal. The second transceiver module 32 may transition to the active mode based on a length of a MWS UL period.

The first transceiver module 24 may operate in the FDD mode or the TDD mode. The MWS signal transmitted during the UL used period may be transmitted in band 7 when operating in the FDD mode and in bands 40 or 41 when operating in the TDD mode.

Referring now to FIGS. 1, 8A, and 8B, a timing diagram illustrating protection of signals transmitted using a first wireless communication standard is shown. Although the coexistence technique associated with FIG. 7 is primarily described for the MWS and WLAN wireless communication standards, the coexistence technique may be used for other wireless communication standards. In FIG. 8A, three rows of periods are shown. In the first row, actual MWS UL and DL periods and a gap period (GP) are shown. In the second row, MWS UL and DL periods indicated to the second transceiver module 32 are shown. Although the first transceiver module 24 may operate based on a repeating pattern of UL and DL periods as shown in the first row, all of these periods may not be indicated to the second transceiver module 32. The first transceiver module 24 may indicate simply the UL and DL periods shown in the second row to the second transceiver module 32. In the third row, a NoA period is shown.

An AP or direct group owner (GO), such as the wireless network device 10, may schedule the NoA period to begin when a MWS DL period is expected to begin and/or when the first transceiver module 24 is expected to receive a MWS signal from the switch module 22. The AP may determine when to schedule the NoA period based on a frame synchronization signal SYNC and/or a configuration signal CONF.

The frame synchronization signal SYNC and/or the configuration signal CONF may indicate lengths of the MWS DL and UL periods, start times of the UL and DL periods, and/or other timing information indicating when the MWS DL and UL periods begin and end. Examples of the frame synchronization signal SYNC and the configuration signal CONF are shown in FIG. 15. The second transceiver module 32 schedules the NoA period and may transmit a NoA signal to other stations based on lengths of the MWS DL and UL periods.

Stations, including the wireless network device 10, that are connected to the AP and/or the second transceiver module 32 do not transmit signals (e.g., WLAN or Wi-Fi signals) during the NoA period. If the first transceiver module 24 is in the sleep mode and the frame synchronization signal SYNC and the configuration signal CONF are provided to the second transceiver module 32, then the second transceiver module 32 may schedule the NoA period. The NoA period may be scheduled to occur while the first transceiver module 24 is in the active mode. NoA periods may be scheduled repeatedly and/or periodically and based on durations of MWS frames and/or periods. The NoA periods may be used to prevent WLAN signal transmission while MWS signals are expected to be received by the first transceiver module 24 and from the switch module 22. This protects received MWS signals by preventing desensitization of the MWS signals by transmission and/or reception of WLAN or Wi-Fi signals. As an example, the MWS signals may be received in bands 40 and 41. The first transceiver module 24 may receive the MWS signals while operating in the TDD mode. The NoA period in FIG. 8A may be increased in length based on the TxON signal received from the first transceiver module 24.

In FIG. 8B, three rows of periods are shown. In the first row, actual MWS UL and DL periods and a gap period (GP) are shown. In the second row, MWS UL and DL periods indicated to the second transceiver module 32 are shown. In the third row, a NoA period is shown.

An AP or direct group owner (GO), such as the wireless network device 10, may schedule the NoA period to begin when a MWS DL period is expected to end and the MWS UL period is expected to begin and/or when the first transceiver module 24 is expected to transmit a MWS signal to the switch module 22. The AP may determine when to schedule the NoA period based on a frame synchronization signal SYNC and/or a configuration signal CONF. The frame synchronization signal SYNC and/or the configuration signal CONF may indicate lengths of the MWS DL and UL periods, start times of the UL and DL periods, and/or other timing information indicating when the MWS DL and UL periods begin and end.

Stations, including the wireless network device 10, that are connected to the AP and/or the second transceiver module 32 do not transmit signals (e.g., WLAN or Wi-Fi signals) during the NoA period. The NoA period may be used to prevent WLAN signal transmission while MWS signals are expected to be transmitted by the first transceiver module 24 and to the switch module 22. This protects WLAN or Wi-Fi signals from being affected by MWS transmitted signals. MWS signals received during the MWS DL period may not be affected by transmitted WLAN signals and/or Wi-Fi signals due to filters associated with the first transceiver module 24. The NoA period in FIG. 8B may be reduced in length based on the TxON signal received from the first transceiver module 24.

In FIGS. 9A and 9B, timing diagrams illustrating use of an unused UL and DL periods of a first wireless communication standard for scheduled power save triggered signals of another wireless communication standard are shown. The implementation of FIG. 9B may be used when WLAN or Wi-Fi signals transmitted by the second transceiver module 32 can be affected by MWS signals transmitted by the first transceiver module 24. DL and UL periods for MWS signals are shown. The first transceiver module 24 may generate a UL indication signal TxON, similar to the UL indication signal TxON of FIG. 7. The second transceiver module 32 may operate in the sleep mode prior to and subsequent to an unused UL and/or DL period of an MWS UL and/or DL period. The frame synchronization signal SYNC and configuration signal CONF may be transmitted as described above to indicate start, duration and end times of the MWS DL and UL periods. In addition, a frame offset signal OFFSET may also be transmitted from the first transceiver module 24 to the second transceiver module 32 to indicate an offset or delay in a period, such as a delay in a DL, UL, and/or used UL period. Based on the information received in the frame synchronization signal SYNC, the configuration signal CONF, and/or the frame offset signal OFFSET, the second transceiver module 32 determines a duration of the MWS UL and DL periods that are unused.

Although the following tasks are described with respect to the wireless network device 10 performing as a non-AP station, the wireless network device 10 when operating in the AP mode may instead perform the tasks associated with the mentioned AP. At a beginning of the unused UL period, a beginning of a MWS DL period, and/or during the MWS DL period, the second transceiver module 32 may generate a power save (PS) poll signal and/or user data signal. The PS poll signal may request that the wireless network device 10 return to the PM. The PS poll signal and/or the user data signal may be transmitted from the second transceiver module 32 to the AP via the switch module 22. The AP may then respond with an ACK signal indicating that the PS poll signal and/or the user data signal was received. The AP may then transmit a user data signal to the second transceiver module 32, which may be received via the switch module 22. The second transceiver module 32 may then respond with a second ACK signal and then return to the sleep mode.

The first transceiver module 24, the coexistence arbitration module 36, and/or the frame module 328 of FIG. 15 may indicate to the second transceiver module 32 lengths of the MWS DL periods and MWS UL periods. The second transceiver module 32 may transmit the PS poll signal and the second ACK signal based on lengths of a MWS DL period and a MWS UL period. The AP may have a predetermined window in which to transmit the user data.

The first transceiver module 24 may operate in the FDD mode or the TDD mode. The MWS signal transmitted during the UL used period may be transmitted in band 7 when operating in the FDD mode and in bands 40 or 41 when operating in the TDD mode In FIG. 9A, although the PS poll and ACK signals transmitted by the second transceiver module are shown as being transmitted during the unused UL period, the PS poll and ACK signals may be transmitted during the used UL period shown or other used UL period. The PS poll and ACK signals transmitted by the second transceiver module 32 are transmitted during a used UL period subsequent to receiving a packet from the AP during an unused UL period.

In FIG. 9B, although the second transceiver module 32 is shown as being in the sleep mode during MWS UL periods, the second transceiver module 32 may remain active and transmit PS poll and ACK signals during a MWS UL period following a MWS DL period in which an ACK signal and data were received from an AP.

Figure 10A:
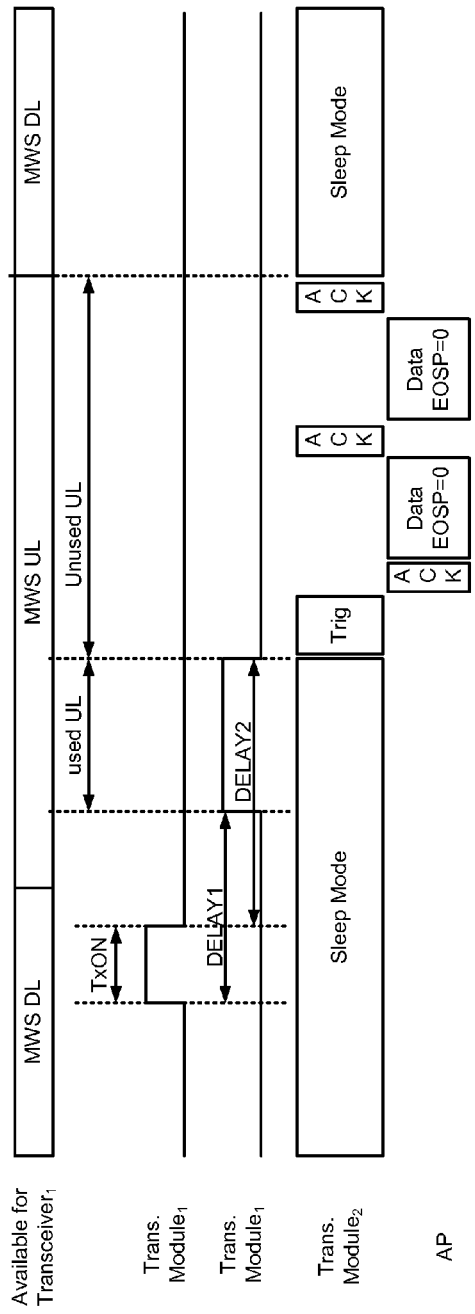
FIGS. 10A and 10B are timing diagrams illustrating use of uplink and downlink periods of a first wireless communication standard for unscheduled power save triggered signals of another wireless communication standard in accordance with one implementation of the present disclosure.
Figure 10B:
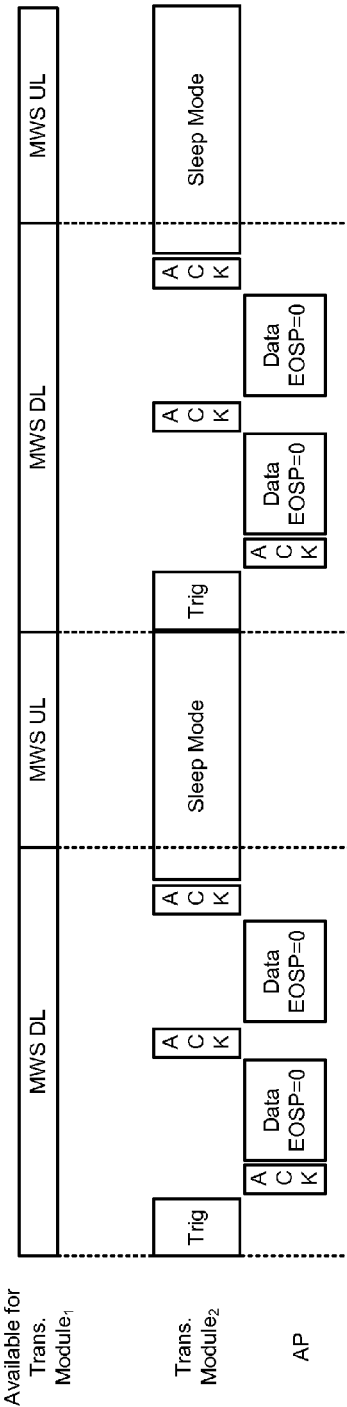

In FIGS. 10A and 10B, timing diagrams illustrating use of UL and DL periods of a first wireless communication standard for unscheduled power save triggered signals of another wireless communication standard are shown. The implementation of FIG. 10B may be used when WLAN or Wi-Fi signals transmitted by the second transceiver module 32 can be affected by MWS signals transmitted by the first transceiver module 24. DL and UL periods for MWS signals are shown. The first transceiver module 24 may generate a UL indication signal TxON, similar to the UL indication signal TxON of FIG. 7. The second transceiver module 32 may operate in the sleep mode prior to and subsequent to (i) an unused UL period of an MWS UL period, and/or (ii) a MWS DL period.

The frame synchronization signal SYNC and configuration signal CONF may be transmitted as described above to indicate start, duration and end times of the MWS DL and UL periods. In addition, a frame offset signal OFFSET may also be transmitted from the first transceiver module 24 to the second transceiver module 32 to indicate an offset or delay in a period, such as a delay in a DL, UL, and/or used DL period. Based on the information received in the frame synchronization signal SYNC, the configuration signal CONF, and/or the frame offset signal OFFSET, the second transceiver module 32 determines a duration of the MWS UL period that is unused and/or MWS DL period.

Although the following tasks are described with respect to the wireless network device 10 performing as a non-AP station, the wireless network device 10 when operating in the AP mode may instead perform the tasks associated with the AP. At a beginning of the unused UL period and/or a MWS DL period, the second transceiver module 32 may generate an unscheduled automatic power save delivery (U-APSD) trigger frame to the AP. The AP may then respond with an ACK signal indicating that the U-APSD trigger frame was received. The AP may then transmit a user data signal and/or user frames to the second transceiver module 32, which may be received via the switch module 22. The user data may be transmitted during a first end of service period (EOSP). Multiple EOSPs are shown with corresponding ACK signals. The duration of the EOSPs may be indicated by the U-APSD.

The second transceiver module 32 returns to the sleep mode subsequent to the last ACK signal, the unused UL period, and/or corresponding MWS DL period. The first transceiver module 24 may indicate to the second transceiver module 32 lengths of the MWS DL periods and MWS UL periods. The second transceiver module 32 may transmit the PS poll signal and the second ACK signal based on lengths of a MWS DL period and a MWS UL period. The AP may have a predetermined window in which to transmit the user data.

The first transceiver module 24 may operate in the FDD mode or the TDD mode during the UL used period. The MWS signal transmitted during the UL used period may be transmitted in band 7 when operating in the FDD mode and in bands 40 or 41 when operating in the TDD mode.

In FIG. 10A, although the trigger and ACK signals transmitted by the second transceiver module 32 are shown as being transmitted during the unused UL period, the trigger and ACK signals may be transmitted during the used UL period shown or other used UL period. The trigger and ACK signals transmitted by the second transceiver module 32 are transmitted during a used UL period subsequent to receiving a packet from the AP during an unused UL period.

In FIG. 10B, although the second transceiver module 32 is shown as being in the sleep mode during MWS UL periods, the second transceiver module 32 may remain active and transmit trigger and ACK signals during a MWS UL period following a MWS DL period in which an ACK signal and data were received from an AP.

Figure 11:
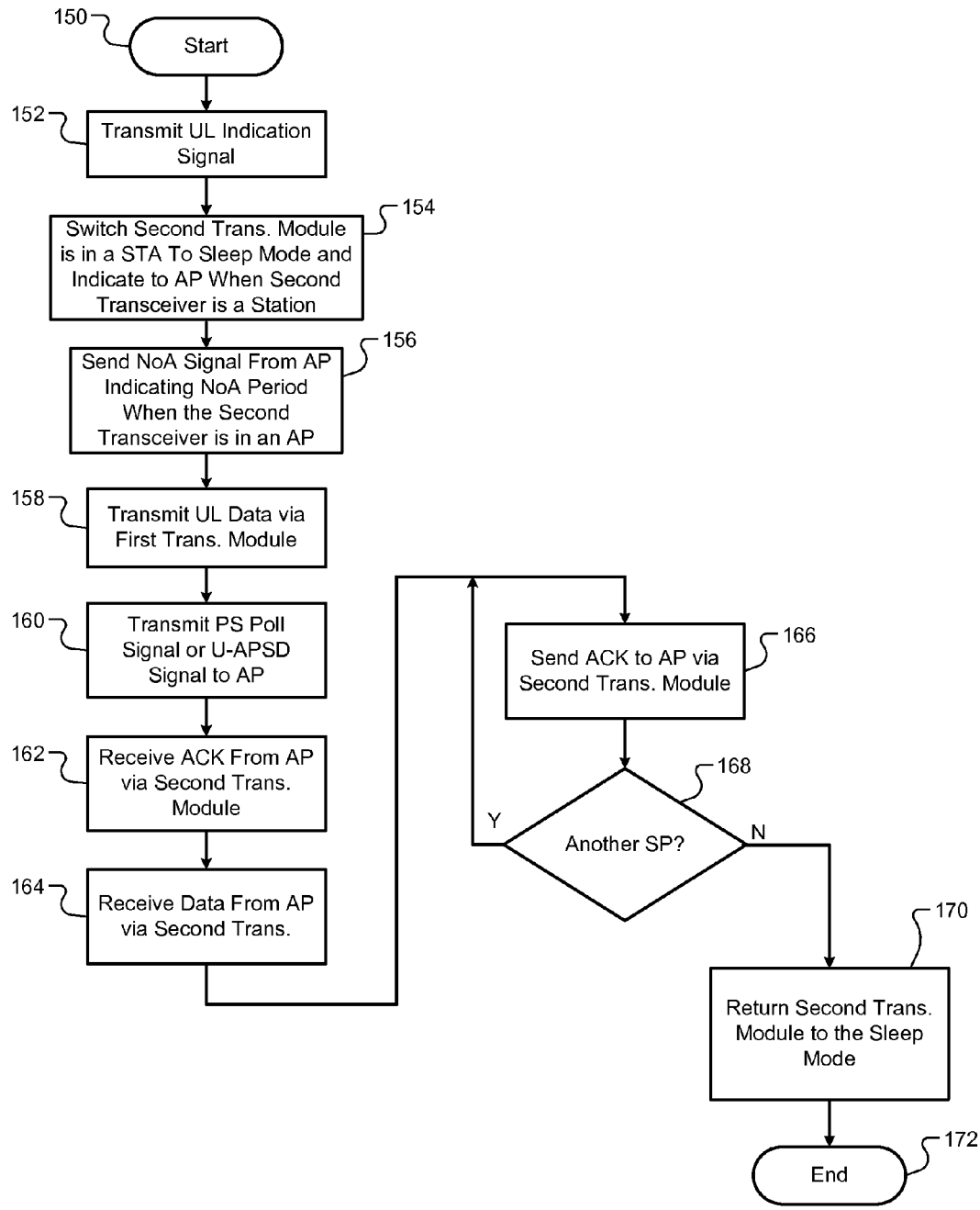
FIG. 11 illustrates a coexistence method associated with the implementations of FIGS. 7-10.

Referring now to FIGS. 1 and 11, a method of operating the coexistence system 17 is shown in accordance with the implementations of FIGS. 7-10. The method may begin at 150.

At 152, a UL indication signal TxON is transmitted from the first transceiver module 24 to the second transceiver module (e.g., one of the transceiver modules 32, 34). At 154, the second transceiver module is transitioned to the sleep mode in response to the UL indication signal TxON when the second transceiver module 32 is in a station. This is indicated to an AP, as described above. At 156, the AP transmits a NoA signal indicating a NoA period in response to the UL indication signal TxON when the second transceiver module 32 is in the AP. At 158, UL data is transmitted via the first transceiver module 24 during a used portion of an UL period.

The following tasks 160-168 are performed during an unused period of the UL period of the first transceiver module 24. At 160, the second transceiver module transmits a PS poll signal or a U-ASPD signal to the AP. At 162, the second transceiver module receives an ACK signal from the AP, which is sent in response to the PS poll signal or the U-APSD signal.

At 164, the second transceiver module may transmit a data signal to the second transceiver module. At 166, the second transceiver module may send an ACK signal to the AP in response to receiving the data signal. At 168, the second transceiver module may determine whether another service period (SP) is to be implemented. If yes, task 164 may be performed, otherwise task 170 may be performed. At 170, the second transceiver module returns to the sleep mode. This may occur when there is no further SPs to implement, during (i) the unused period and/or (ii) prior to or at an end of the UL period. The method may end at 172.

Figure 14:
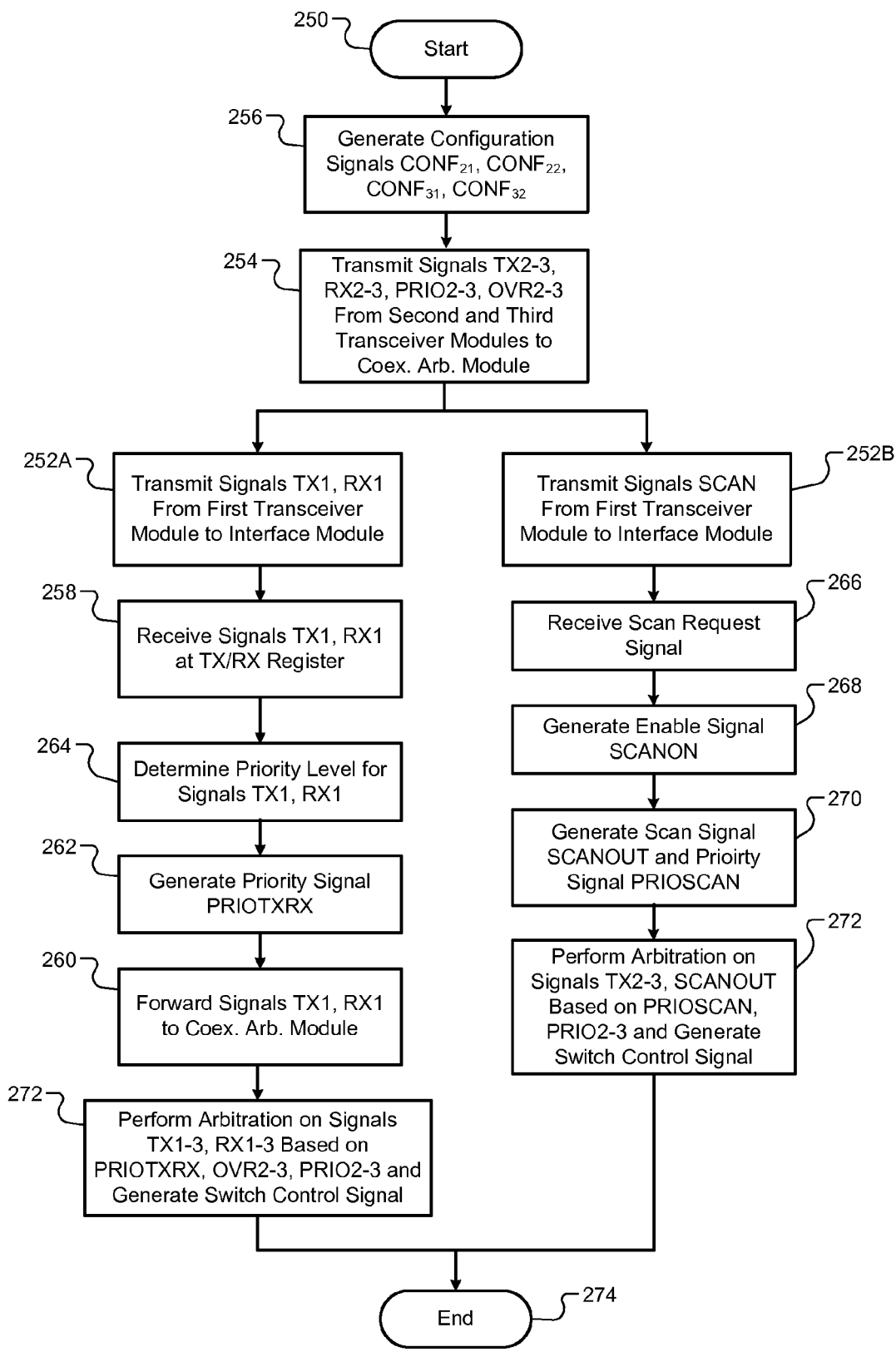
FIG. 14 illustrates a method of operating the coexistence systems of FIGS. 1 and 12.

Referring now to FIGS. 12-14, a coexistence system 200, a priority table, and a corresponding method of operating the coexistence system 200 are shown. The method may be used to operate the coexistence system 17 of FIG. 1 and may begin at 250. The coexistence system 200 includes the host module 202, a communication module 204 (e.g., the first communication module 18 of FIG. 1) with a first transceiver module 206, a second transceiver module 208, a third transceiver module 210, a coexistence interface 212, a coexistence arbitration module 216 and a switch module 218. Data signals are transmitted between (i) the host module 202, and (ii) the transceiver modules 206, 208, 210. The first transceiver module 206 may transmit and/or receive signals satisfying at least one of the MWS wireless communication standards. The second transceiver module 208 may transmit and receive signals conforming to, for example, WLAN and/or Wi-Fi standards. The third transceiver module 210 may transmit and receive signals conforming to, for example, BT standards.

The transceiver modules 208, 210 may generate configuration signals $CONF_{21}$, $CONF_{31}$, $CONF_{22}$, $CONF_{32}$. The configuration signals $CONF_{21}$, $CONF_{31}$, $CONF_{22}$, $CONF_{32}$ may be generated respectively by the transceiver modules 208, 210. The configuration signals $CONF_{21}$, $CONF_{31}$, $CONF_{22}$, $CONF_{32}$ each include a value. The transceiver modules 208, 210 may generate these values based on the status information via, for example, the status signal STAT2 received from the first transceiver module 206, as shown at 252.

The transceiver modules 208, 210 send transmit request signals TX2-3, receive request signals RX2-3, second and third priority signals PRIO2-3, and overlap signals OVLP2-3 to the coexistence arbitration module 216, as shown at 254. The transmit request signals TX2-3 request transmission of signals by the corresponding one of the transceiver modules 208, 210. The receive request signals RX2-3 request reception of signals from the switch module 218 to the corresponding one of the transceiver modules 208, 210. The priority signals PRIO2-3 indicate a priority level for the corresponding transmit and receive signals and/or task being performed. Example priority levels are provided in FIG. 13. The priority table of FIG. 13 may be stored in the coexistence arbitration module 216.

The overlap signals OVLP2-3 are a '1' when there is potential desensitization of a first signal or a second signal due to transmission or reception of (i) the first signal according to a wireless communication standard of a corresponding one of the transceiver modules 208, 210, and (ii) a second signal via the first transceiver module 206. Desensitization may occur, for example, when a frequency of the first signal is within a predetermined range of a frequency of the second signal. The transceiver modules 206, 208, 210 may also transmit and/or receive data signals DATA1-3, such as user data signals, to and from the switch module 218. The overlap signals OVLP2-3 may be a '0' when there is no potential desensitization of the first and second signals, such as when the frequency of the first signal is outside of the predetermined range.

The first transceiver module 206 may transmit a status signal to the transceiver modules 208, 210. The status signal may be transmitted directly from the first transceiver module 206 to the transceiver modules 208, 210 or may be sent to the transceiver modules 208, 210 via the host module 202, as shown. A first status signal STAT1 and a second status signal STAT2 are shown. The status signals STAT1, STAT2 may indicate a status of the first transceiver module 206 including whether the first transceiver module 206 is: establishing a connection with a station; connected to a station; performing a scan; and/or performing and/or involved in a handover. The status signals STAT1, STAT2 may also include a priority levels and/or frequencies of signals about to be received and/or transmitted via the first transceiver module 206. The above-stated overlap signals OVR2-3 may be generated based on, for example, the second status signal STAT2.

Tasks 256-276 may be performed subsequent to tasks 252-254. Tasks 256-266 may be performed in parallel with tasks 268-276. In one implementation, tasks 256-266 are performed while tasks 268-276 are not performed. In another implementation, tasks 268-276 are performed while tasks 256-266 are not performed.

The first transceiver module 206 sends a transmit request signal TX1 and a receive request signal RX1 to the coexistence interface, as shown at 256. The transmit request signal TX1 requests transmission of signals by the transceiver module 206. The receive request signal RX1 requests reception of signals from the switch module 218 to the transceiver module 206.

The TX/RX register module 230 receives the transmit request signals and the receive request signals from the first transceiver module 206 (shown at 258). The TX/RX register module 230 may also receive one or more of the configuration signals $CONF_{21}$, $CONF_{31}$ (shown at 260). The TX/RX register module 230 determines a priority level for the transmit request signal TX1 and receive request signal RX1 based on the configuration signals $CONF_{21}$, $CONF_{31}$.

The coexistence interface 212 includes a transmit and receive (TX/RX) register module 230, a scan enable module 232, and a scan register module 234. The TX/RX register module 230: generates a priority signal PRIOTXRX (shown at 262) and forwards TX/RX signals TX1, RX1 to the coexistence arbitration module 216 (shown at 264). Tasks 262, 264 may be performed during the same period. Task 262 may be performed while task 264 is performed. The priority signal PRIOTXRX indicates a priority level for the corresponding transmit and receive signals and/or task being performed. The priority signal PRIOTXRX may be generated based on configuration information in the TX/RX register module 230. The configuration information may be based on the configuration signals $CONF_{21}$, $CONF_{31}$. The configuration information may be based on counter values, states of the second and third transceiver modules 208, 210, and/or states of and/or configuration requests from the first transceiver module 206. Configuration information provided from the first transceiver module 206 to the transceiver modules 208, 210 for generation of the priority signal PRIOTXRX can be provided either through the host module 202 or via the coexistence interface 212.

Example priority levels are provided in FIG. 13. The priority table of FIG. 13 may be stored in the coexistence arbitration module 216. The coexistence interface 212 transmits the signals TX1, RX1, PRIOTXRX to the coexistence arbitration module 216.

At 266, the coexistence arbitration module 216 generates a switch control signal SW to control states of switches 238 in the switch module 218 based on the request signals TX1-3, RX1-3, the priority signals PRIO2-3, PRIOTXRX, the overlap signals OVR2-3, the timing of these signals, and/or the arbitration rules. The coexistence arbitration module 216 arbitrates the signals TX1-3, RX1-3 based on the signals PRIOTXRX, OVR2-3, PRIO2-3 and generates the switch control signal accordingly. The method may end at 274. This allocates transmit and receive time slots for each of the transceiver modules 206, 208, 210 relative to each of multiple antennas 240 connected to the switch module 218. The arbitration rules may include priority rules and antenna selection rules. The priority rules may be based on a priority table, such as that provided in FIG. 13. Examples of antenna selection rules are described above. The coexistence arbitration module 216 generates the switch control signal SW as a result of the priority based arbitration. The switch module 218 adjusts the states of switches 238 based on the switch control signal SW.

The first transceiver module 206 sends a scan request signal SCAN to the coexistence interface, as shown at 268. The scan request signal SCAN may indicate that a scan of a particular frequency is to be performed and/or that a probe request signal and/or a beacon signal is to be transmitted on the particular frequency. The scan request signal SCAN indicates the frequency being used for transmitting scan related signals via the switch module 218. Multiple frequencies and/or channels may be tested to detect a frequency and/or channel with the best performance. A scan may include detecting the frequency and/or channel with, for example, the best signal-to-noise ratio (SNR). During the scan, a probe request signal or beacon signal may be transmitted to discover another station.

The scan enable module 232 receives the scan request signal SCAN from the first transceiver module 206, as shown at 270. The scan enable module 232 may alternatively be located in one of the transceiver modules 208, 210 or the transceiver modules 208, 210 may also include a scan enable module. The scan enable module 232 may generate an enable signal SCANON indicating that a SCAN is to be performed for the first transceiver module 206 based on the scan signal SCAN, as shown at 272.

The scan register module 234 may receive the enable signal SCANON and/or the configuration signals $CONF_{22}$, $CONF_{32}$. The scan register module 234 generates a resulting scan signal SCANOUT and a priority scan signal PRIOSCAN based on the enable signal SCANON and/or the configuration signals $CONF_{22}$, $CONF_{32}$, as shown at 274. The resulting scan signal SCANOUT indicates that a scan is to be performed. The priority scan signal PRIOSCAN indicates a priority level of the scan. The priority signal PRIOSCAN indicates a priority level for the corresponding scan signal and/or task being performed.

The priority signal PRIOSCAN may be generated based on configuration information in the scan register module 234. The configuration information may be based on the configuration signals $CON\ F_{22}$, $CONF_{32}$. The configuration information may be based on counter values, states of the second and third transceiver modules 208, 210, and/or states of and/or configuration requests from the first transceiver module 206. Configuration information provided from the first transceiver module 206 to the transceiver modules 208, 210 for generation of the priority signal PRIOSCAN can be provided either through the host module 202 or via the coexistence interface 212.

The coexistence arbitration module 216 may automatically associate a priority level of a task based on scan information received from the communication module 204. This automatic association may be provided without transmission of the priority signal PRIOSCAN to the coexistence arbitration module 216.

Different types of scans may have different priority levels. The first transceiver module 206 may perform various scans such as an establishment scan, a background scan, and/or other type of scan. An establishment scan may refer to when the first transceiver module 206 has lost a connection and/or does not have a connection with a station and is establishing a connection and is searching for a station. A scan may be performed prior to performing a handover of a wireless network device between, for example, two APs. The wireless network device may include the coexistence system 200. The scan may be performed to determine a target AP and time to perform the handover. The scan may include monitoring signals from multiple stations and/or on multiple channels to determine a best channel and/or station for communication. The scan may include the wireless network device transmitting a probe request signal and/or a beacon signal to discover stations and/or APs. A background scan may refer to when a connection has been established and the first transceiver module 206 is searching for a frequency and/or channel for best performance with minimal desensitization. The wireless network device and/or the first transceiver module 206 may be in an active low power mode when performing the background scan.

The first transceiver module 206 can adjust priority levels of MWS traffic based on state of the first transceiver module 206 and signal types being transmitted and/or received via the first transceiver module 206. The state of the first transceiver module 206 may indicate whether the first transceiver module 206 is establishing a connection, has a connection, is involved in a handover, is performing a scan, etc. Example signal types are shown in FIG. 13. The term "traffic" refers to transmitted or received signals including data and scan signals. The priority levels can be adjusted independently for UL traffic, DL traffic, and scan traffic. In the above provided examples, two priority signals PRIOTXRX, PRIOSCAN are provided from the coexistence interface 212 to the coexistence arbitration module 216 to provide independent priority adjustment of transmit/receive and scan operations. This also allows differentiating priorities based on MWS UL periods and MWS DL periods, as the priorities can be changed for each UL and/or DL period.

The first transceiver module 206 can adjust priority levels of the MWS traffic via the status signals STAT1, STAT2. This allows the first transceiver module 206 to perform priority escalations and/or de-escalations. A priority escalation refers to when the first transceiver module 206 raises the priority level of a signal to a higher level. For example, when a connection is lost or when a handover is to be performed, signals transmitted and/or received via the first transceiver module 206 may be provided with a high priority level. A priority de-escalation refers to when the priority level of a signal is lowered. As an example, a priority level of a signal of the second transceiver module 208 may be lowered when a connection for the first transceiver module 206 is lost.

At 276, the coexistence arbitration module 216 generates a switch control signal SW to control states of switches 238 in the switch module 218 based on the request signals TX2-3, SCANOUT, the priority signal PRIO2-3, PRIOSCAN the timing of these signals, and/or the arbitration rules. The coexistence arbitration module 216 arbitrates the signals TX2-3, SCANOUT based on the signals PRIOSCAN, PRIO2-3 and generates the switch control signal accordingly. The method may end at 274. This allocates transmit and receive time slots for each of the transceiver modules 206, 208, 210 relative to each of multiple antennas 240 connected to the switch module 218. The arbitration rules may include priority rules and antenna selection rules. The priority rules may be based on a priority table, such as that provided in FIG. 13. Examples of antenna selection rules are described above. The coexistence arbitration module 216 generates the switch control signal SW as a result of the priority based arbitration. The switch module 218 adjusts the states of switches 238 based on the switch control signal SW.

Referring to FIGS. 12 and 13, a priority table for signals of multiple wireless communication standards is shown. The priority table includes priority levels and signal types for each of the transceiver modules 206, 208, 210. The first column of the priority table indicates the priority level. The highest priority signals are at the top or in the second row of the priority table. As an example, the highest priority signals may be connection establishment signals for the first transceiver module 206. The lowest priority signals are at the bottom or in the last row of the priority table. As an example, the lowest priority signals may be user data or broadcast signals for the third transceiver module 210.

Although the first column of the priority table includes 4 major priority levels (high, medium high, medium, and low), each major priority level may have multiple minor priority levels. As an example, for the high priority level three rows (second, third and fourth rows) are shown. The second row of the table being of higher priority than the third and fourth rows of the table.

In the priority table, the signals and/or data are transmitted between a wireless network device and a station and/or AP to establish a connection. The wireless network device may be the wireless network device in FIG. 1. The wireless network device may include the coexistence system 200 of FIG. 12. For example, the connection establishment signals are signals transmitted between a wireless network device and a station and/or AP to establish a connection between these devices. In the priority table, the RTS signals and the CTS signals are respectively return-to-send signals and the clear-to-send signals. The QOS data is quality of service data. Role switch signals refer to signals associated with, for example, changing a master/slave relationship between two stations. A first station may switch from being a slave device to being a master device and a second station may switch from being a master device to being a slave device.

The first transceiver module 206 may have a persistent usage pattern. The persistent usage pattern refers to a repeating pattern of UL and DL periods, where the UL periods have the same length and/or where the DL periods have the same length. The persistent usage pattern may also or alternatively refer to repeating UL or DL usage periods. A UL usage period refers to a portion of an allocated UL period that is used for transmitting MWS signals. A DL usage period refers to a portion of an allocated DL period that is used for receiving MWS signals. The first transceiver module 206 may indicate the persistent usage pattern to the one or more of the transceiver modules 208, 210, the coexistence interface 212, and/or the coexistence arbitration module 216. This may be done via, for example, the status signals STAT1, STAT2, and/or other signals. The status signals STAT1 and STAT2 may be transmitted via a host controller interface (HCI) and/or a transparent data interface between the host module 202 and the transceiver modules 208, 210 and/or between first transceiver module 206 and the transceiver modules 208, 210. Examples of these interfaces are shown in FIG. 15. The transceiver modules 208, 210, the coexistence interface 212, and/or the coexistence arbitration module 216 may then schedule transmit and/or receive times based on the persistent usage pattern and associated unused MWS periods (may be referred to as unused subframes).

Scheduling transmit and/or receive times by the transceiver modules 208, 210 based on the persistent usage pattern and associated unused MWS periods may include: scheduling transmit and/or receive signals and requests; scheduling scan requests and/or signals; and/or setting priority levels of transmit and/or receive signals. The persistent usage pattern may be indicated to the transceiver modules 208, 210, for example, in voice over Internet protocol (VoIP) LTE implementations to reduce control channel overhead of packets by allowing control channel information to be transmitted during unused UL or DL periods.

The transceiver modules 208, 210 request that the first transceiver module 206 allocate certain amounts of time for the transceiver modules 208, 210 to transmit and/or receive data during repeating UL and/or DL periods of the first transceiver module 206. The amount of time that is made available for one of the transceiver modules 208, 210 and for each of repeating UL/DL cycles of the first transceiver module 206 may be referred to as a persistent puncture pattern. The transceiver modules 208, 210 may provide respective maps of recurrent puncture slots to the first transceiver module 206 indicating the amount of time per slot requested by the transceiver modules 208, 210. Each slot may be in a UL period of the first transceiver module 206. The first transceiver module 206 may then allocate unused UL and/or DL periods to provide the persistent puncture pattern based on the maps indicated by the transceiver modules 208, 210. The amount of time requested by each of the transceiver modules 208, 210 may be a fixed amount. The first transceiver module 206 may adapt scheduling of MWS transmit and receive signals based on the maps and/or determined persistent puncture patterns.

Micro-second (µs) granularity in allocated times can be provided for data transmission by having the transceiver modules 208, 210 request that the first transceiver module 206 allocate certain amounts of time for the transceiver modules 208, 210 during UL and/or DL periods of the first transceiver module 206. The provided time is for the transceiver modules 208, 210 to transmit and/or receive data during the UL and/or DL periods of the first transceiver module 206. The transceiver modules 208, 210 may provide the certain amount of time in a predetermined number of us and the first transceiver module 206 may then convert the amounts of time into a number of unused periods (or number of subframes). Each unused period is a predetermined number of us long and is in a UL period of the first transceiver module 206.

Figure 16:
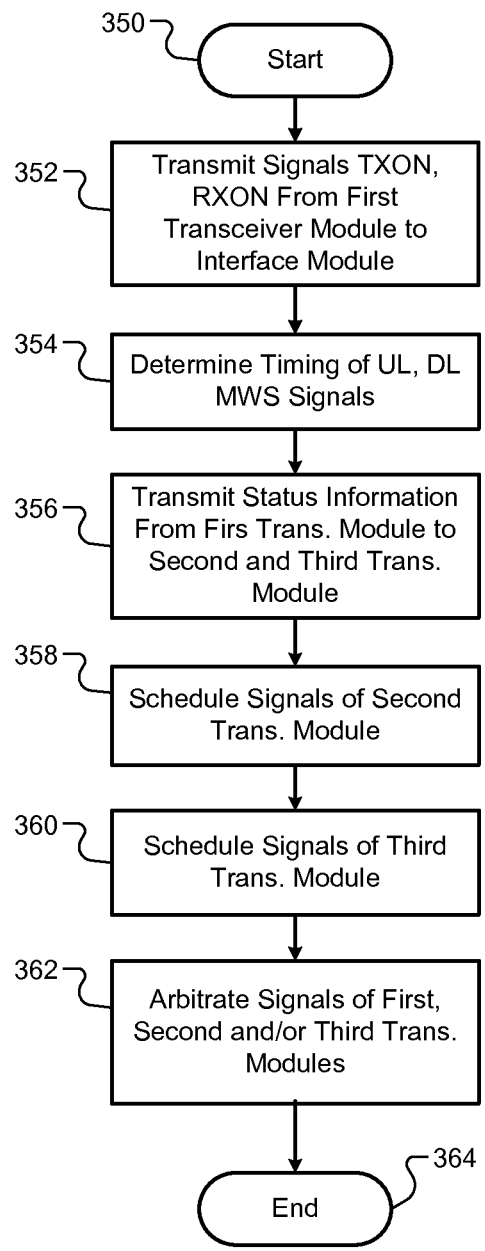
FIG. 16 illustrates a method of operating the coexistence system of FIG. 15.

Referring now to FIGS. 15 and 16, another coexistence system 300 with dedicated antennas and corresponding operating method are shown. The method may begin at 350. The coexistence system 300 includes a host module 302, a first transceiver module 304, an interface module 306, a first switch module 308, and a second switch module 310. The host module 302 may be connected to (i) the first transceiver module 304 via a first coexistence interface 312, and (ii) the interface module 306 via a second coexistence interface 314. The interfaces 312, 314 may be host controller interfaces (HCI) or transparent data interfaces. The data signals are transmitted between (i) the host module 302, and (ii) the first transceiver module 304 and the interface module 306.

The first transceiver module 304 includes the first coexistence interface 312. The first coexistence interface 312 is in communication with the interface module 306 via a bus 320. A UL indication signal TxON or a DL indication signal RxON may be transmitted from the first coexistence interface 312 to a second coexistence interface 314 of the interface module 306 to indicate that the first transceiver module 304 is to transmit or receive a signal in a predetermined period of time, as shown at 352. The first transceiver module 304 may comply with MWS standards. Data is transmitted between the first transceiver module 304 and the first switch module 308. The first switch module 308 transmits and receives data via first antennas 322 based on a first switch control signal SW1 received from the first transceiver module 304.

The interface module 306 includes the second coexistence interface 314, a communication module 324 (e.g., the second communication module 20 of FIG. 1), and a coexistence arbitration module 326. The communication module 324 includes a frame module 328, a second transceiver module 330 and a third transceiver module 332. The frame module 328 determines timing of UL and DL MWS signals (referred to hereinafter as MWS signal timing) based on a frame synchronization signal SYNC1 from the second coexistence interface 314, as shown at 354. The frame synchronization signal SYNC1 may include: MWS transmit times; MWS receive times; and start, duration and end times of MWS DL periods, MWS UL periods, and MWS used UL periods, and/or other synchronization information. The frame module 328 may then indicate the MWS signal timing to the transceiver modules 330, 332.

The first transceiver module 304 may provide status information to the host module 302 via a first status signal STAT1. The host module 302 may then provide the status information to the transceiver modules 330, 332. The status information may indicate an operating mode of the first transceiver module 304 and/or whether the first transceiver module 304: is establishing a connection; has a connection; is transmitting; is receiving; is in a sleep mode; and/or is associated with a handover being performed. The status information may include received signal strength information (RSSI) for UL and DL, transmit power for UL and DL, or other configuration information. Although the status information is shown as being provided to the host module 302, the status information may be provided to the interface module 306 and/or one or more of the transceiver modules 330, 332. The status signals STAT1, STAT2 may also or alternatively indicate a status of the first transceiver module 304 including: MWS transmit frequencies: MWS receive frequencies; MWS transmit times; MWS receive times; and start, duration and end times of MWS DL periods, MWS UL periods, and MWS used UL periods. The transmission of status information via the status signals STAT1, STAT2 is shown at 356.

In one implementation the first transceiver module 304 does not provide the status information to the host module 302 and the host module does not provide the status information to the transceiver modules 330, 332. The first transceiver module 304 provides the status information and/or transmit information to the coexistence arbitration module 326. The coexistence arbitration module then performs arbitration for the transceiver modules 304, 330, 332. In another implementation, the transceiver modules 330, 332 is only informed of the states of the first transceiver module 304 when the first transceiver module 304 is performing a scan.

The second transceiver module 330 may comply with WLAN and/or Wi-Fi standards. The second transceiver module 330 transmits and receives signals based on (i) the UL indication signal TxON, (ii) the DL indication signal RxON and the MWS signal timing, and/or (iii) the second synchronization signal SYNC2. The signals TxOn, RxON, SYNC2 may be received from the second coexistence interface 314. The UL indication signal TxON and the DL indication signal RxON may be forwarded from the second coexistence interface 314 to the second transceiver module 330. The second transceiver module 330 schedules signal transmission and reception based on the signals received from the frame module 328 and the second coexistence interface 314, as shown at 358. The second transceiver module 330 transmits data to and receives data from the second switch module 310.

The third transceiver module 332 may comply with BT standards. The third transceiver module 332 transmits and receives signals based on (i) a second frame synchronization signal SYNC2, (ii) the MWS signal timing, and/or (iii) the signals TxON, RxON. The signals TxOn, RxON, SYNC2 may be received from the second coexistence interface 314. The second frame synchronization signal SYNC2 may be generated by the second coexistence interface 314 and transmitted to the third transceiver module 332. The second synchronization signal SYNC2 may be the same as or include information that is in the first synchronization signal SYNC1. The third transceiver module 332 schedules signal transmission and reception based on the signals received from the frame module 328 and the second coexistence interface 314, as shown at 360. The third transceiver module 332 transmits data to and receives data from the second switch module 310.

At 362, the coexistence arbitration module 326 arbitrates transmit and receive signals of the transceiver modules 330, 332 based on (i) transmit and receive request signals from the transceiver modules 330, 332, and (ii) real time signals REAL from the second coexistence interface 314. The real time signals may include the UL indication signal TxON and the DL indication signal RxON. The method may end at 364. The coexistence arbitration module 326 generates a second switch control signal SW2.

Although dedicated antennas 322 are shown for the first transceiver module 304, the first switch module 308 and antennas 322 may not be included. The first transceiver module 304 may send transmit and receive requests to the coexistence arbitration module 326 via the second coexistence interface 314 and transmit and receive data signals from the second switch module 310 and associated antennas 340. The coexistence arbitration module 326 may then perform arbitration of signals received from the transceiver modules 304, 330, 332. In another implementation, the coexistence arbitration module 326 generates the first switch control signal SW1 instead of the first transceiver module 304.

Figure 17:
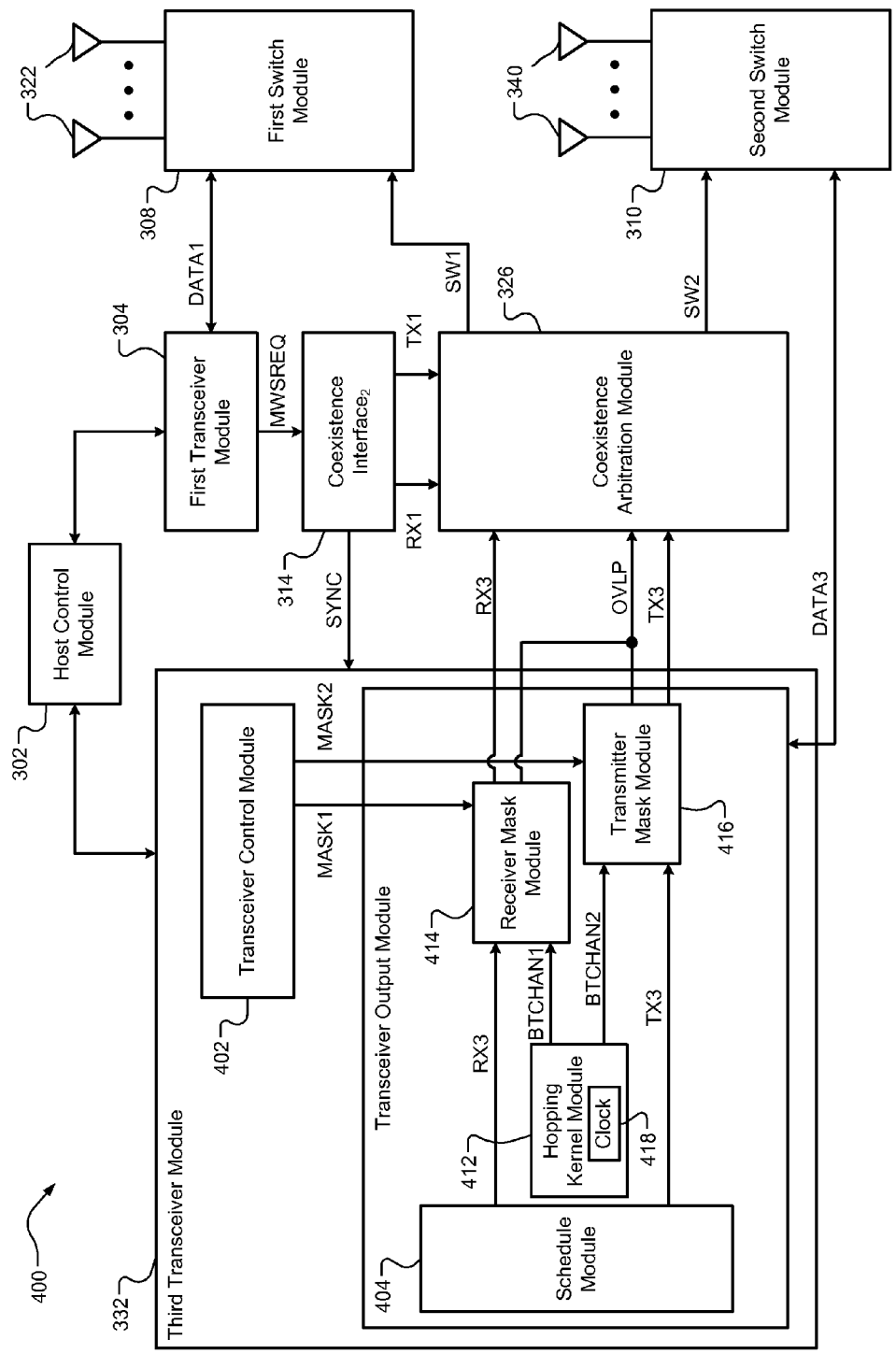
FIG. 17 is a functional block diagram of a portion of the coexistence system of FIG. 15 illustrating potential desensitization detection via masks.
Figure 18:
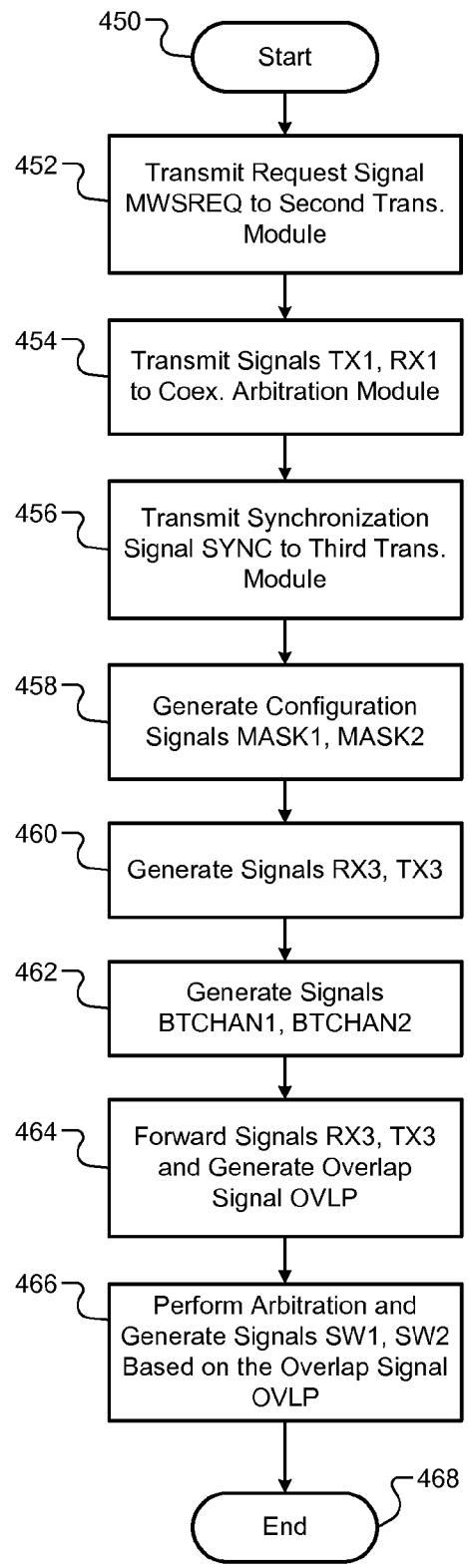
FIG. 18 illustrates a method of operating the portion of the coexistence system of FIG. 17.

Referring now to FIGS. 15, 17 and 18, a portion 400 of the coexistence system 300 of FIG. 15 illustrating potential desensitization detection via masks and a corresponding operating method are shown. The method may begin at 450.

The portion 400 includes the host module 302, the first transceiver module 304, the second coexistence interface 314, the switch modules 308, 310, the third transceiver module 332, and the coexistence arbitration module 326. Data signals are transmitted between (i) the host module 302, and (ii) the transceiver modules 304, 332. Although FIG. 17 is shown and described with respect to the third transceiver module 332, the same implementation of FIG. 17 may be applied to the second transceiver module 330.

The first transceiver module 304 transmits and receives data DATA1 via the first switch module 308. The first transceiver module 304 sends request signals MWSREQ to the second coexistence interface 314 when requesting to transmit and receive data, as shown at 452. The second coexistence interface 314 transmits a transmit request signal TX1 and a receive request signal RX1 to the coexistence arbitration module 326 based on the request signals MWSREQ, as shown at 454. The second coexistence interface 314 may also transmit a frame synchronization signal SYNC (e.g., one of the synchronization signals SYNC1, SYNC2) to the third transceiver module 332 based on the request signals MWSREQ, as shown at 456.

The third transceiver module 332 transmits and receives data DATA3 via the second switch module 310. The third transceiver module 332 (or the second transceiver module 330) includes a transceiver control module 402 and a transceiver output module 404. The transceiver control module 402 generates mask configuration signals MASK1, MASK2 based on configuration information, as shown at 458. The configuration information may include: transmit power and/or receive power of signals of the first transceiver module 304 and/or the second transceiver module 330; RSSI of the first transceiver module 304 and/or the second transceiver module 330; a channel of the first transceiver module 304; isolation values indicating an amount of isolation between two or more of the antennas 322, 340; filter characteristic values of filters of the first transceiver module 304 and/or the third transceiver module 332; and/or other configuration information.

Each of the mask configuration signals MASK1, MASK2 may be, for example, an 8-bit value and indicate a channel and include a direction bit. The channel may refer to a predetermined frequency that may cause desensitization of (i) a data signal transmitted from the second transceiver module 330 to the first switch module 308, or (ii) a data signal received by the second transceiver module 330 from the first switch module 308. The direction bit indicates a range of frequencies that can cause desensitization of the data signals transmitted from or received by the second transceiver module 330. The direction bit indicates whether frequencies within a MWS band and greater than the predetermined frequency or frequencies within a MWS band and less than the predetermined frequency can cause desensitization.

As a result, if the first transceiver module 304 transmits or receives a signal at the predetermined frequency or a frequency within the range indicated by the direction bit, desensitization may result with a signal transmitted by or received from the second transceiver module 330. For example, the predetermined frequency may be a frequency in band 40. If the first transceiver module 304 is transmitting or receiving a signal at a frequency that is in band 40 and is at or greater than the predetermined frequency, then desensitization may result with a signal of the second transceiver module 330 transmitted or received at a frequency in the ISM band.

The transceiver output module 404 includes a schedule module 410, a hopping kernel module 412, a receiver mask module 414, and a transmitter mask module 416. The schedule module 410 generates a receive request signal RX3 and a transmit request signal TX3 when the third transceiver module 332 is to receive a data signal and/or transmit a data signal via the second switch module 310, as shown at 460. The data signals may include one or more frames of data. The hopping kernel module 412 may determine a channel for each of the data signals and/or for each of the frames of the data signals. The channel used to transmit and/or receive each of the frames of the data signals may be changed for each of the frames of the data signals by the hopping kernel module 412. The hopping kernel module 412 may change the channel being used for each of the frames based on a frequency of an internal clock 418 and/or associated clock signal. The hopping kernel module 412 may generate a receive channel signal BTCHAN1 and a transmit channel signal BTCHAN2 respectively indicating the frequencies used for receiving and transmitting, which may be different, as shown at 462.

The channel signals BTCHAN1 and BTCHAN2 are provided to the receiver mask module 414 and the transmitter mask module 416. The receiver mask module 414 forwards the receive request signal RX3 and generates an overlap signal OVLP based on the first mask configuration signals MASK1 and the receive channel signal BTCHAN1. The overlap signal OVLP indicates whether there is potential desensitization of (i) the signal to be received by the third transceiver module 332 via the second switch module 310, and (ii) a signal being transmitted from or received by the first transceiver module 304 via the first switch module 308. The transmitter mask module 416 forwards the transmit request signal TX3 and generates the overlap signal OVLP based on the second mask configuration signals MASK2 and the transmit channel signal BTCHAN2. The overlap signal OVLP generated by the transmitter mask module 416 may be (i) independent of the overlap signal generated by the receiver mask module 414, or (ii) combined with the overlap signal OVLP generated by the receiver mask module 414 to provide the overlap signal OVLP, as shown. The overlap signal OVLP generated by the transmitter mask module 416 indicates whether there is potential desensitization of (i) the signal to be transmitted by the third transceiver module 332 via the second switch module 340, and (ii) a signal being transmitted from or received by the first transceiver module 304 via the first switch module 308. Forwarding and generation of the signals RX3, TX3, OVLP is shown at 464.

The coexistence arbitration module 326 generates the first and switch control signals SW1, SW2 based on the request signals TX1, RX1, TX3, RX3 and the overlap signal OVLP, as shown at 466. The method may end at 468. The coexistence arbitration module 326 performs arbitration on the request signals TX1, RX1, TX3, RX3 based on the overlap signal OVLP and arbitration rules. Examples of arbitration rules are provided above.

As an example, arbitration tables, such as priority tables and antenna selection tables, may be used when the overlap signal OVLP is a one and may not be used when the overlap signal is a zero. The overlap signal OVLP equal to one indicates potential desensitization and the overlap signal OVLP equal to zero indicates no potential desensitization. If the overlap signal OVLP is equal to one, the first transceiver module 304 may receive signals while the third transceiver module 332 transmits signals. Similarly, if the overlap signal is equal to one, the third transceiver module 332 may receive signals while the first transceiver module 304 transmits signals. The coexistence arbitration module 326 may prevent the first transceiver module 304 from transmitting or receiving while and the third transceiver module 332 is transmitting or receiving.

The coexistence arbitration module 326 may permit the third transceiver module 332 to receive regardless of whether coexistence arbitration module 326 grants permission to the first transceiver module 304 to transmit and/or receive. This is referred to as opportunistic reception. In another implementation, the coexistence arbitration module 326 permits the first transceiver module 304 to receive while the third transceiver module 332 is receiving, but does not permit the first transceiver module 304 to transmit while the third transceiver module 332 is transmitting.

Although dedicated antennas are shown for the first transceiver module 304 and the third transceiver module 332, the first switch module 308 and associated antennas 322 may not be included. The first transceiver module 304 may send transmit and receive requests to the coexistence arbitration module 326 via the second coexistence interface 314 and transmit and receive data signals from the second switch module 310.

Figure 19:
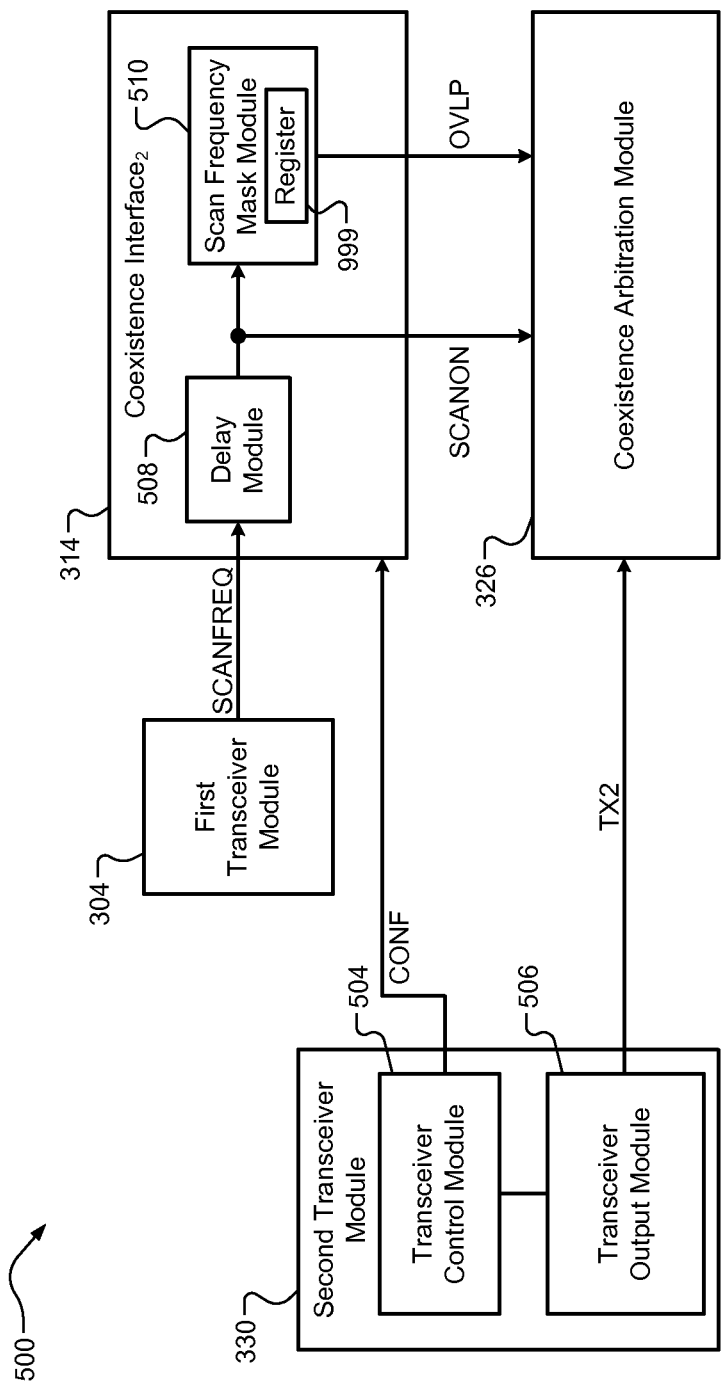
FIG. 19 is a functional block diagram of a portion of the coexistence system of FIG. 15 illustrating scan based arbitration for WLAN.
Figure 20:
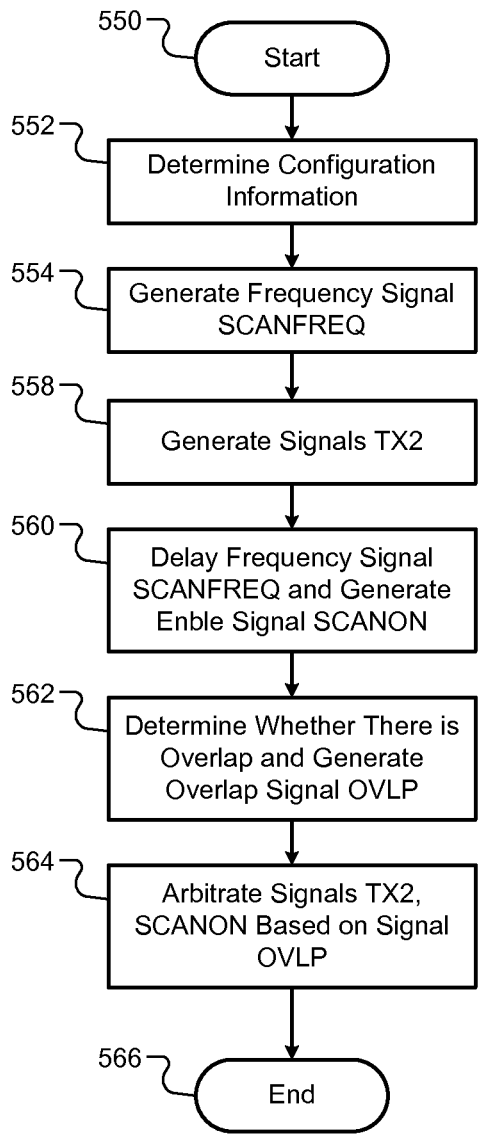
FIG. 20 illustrates a method of operating the portion of the coexistence system of FIG. 19.

Referring now to FIGS. 15, 19 and 20, a portion 500 of the coexistence system 300 of FIG. 15 illustrating scan based arbitration for WLAN and a corresponding operating method are shown. Although this method is described for performance of a scan, the method may be used for coexistence arbitration when transceivers are changing frequencies dynamically. The method may begin at 550. The portion 500 includes the transceiver modules 304, 330, the second coexistence interface 314, and the coexistence arbitration module 326. Although FIG. 15 is shown and described with respect to the second transceiver module 330, the same implementation of FIG. 15 may be applied to the third transceiver module 332.

The second transceiver module 330 (or third transceiver module 332) includes a transceiver control module 504 and a transceiver output module 506. As shown at 552, the transceiver control module 504 generates a configuration signal CONF, which may include configuration information, such as: transmit power and/or receive power of signals of the first transceiver module 304 and/or the second transceiver module 330; RSSI of the first transceiver module 304 and/or the second transceiver module 330; a channel of the second transceiver module 330; isolation values indicating an amount of isolation between two or more of the antennas 322, 340 antennas; filter characteristics of filters of the first transceiver module 304 and/or the second transceiver module 330; and/or other configuration information.

The first transceiver module 304 generates a frequency signal SCANFREQ indicating a frequency on which the first transceiver module 304 is to perform a scan, as shown at 554. The scan may include searching frequencies for a best channel for MWS based communication. The frequency signal SCANFREQ may be a value that identifies a bit or storage location in a register 502 of second coexistence interface 314. Each bit in the register 502 may be a zero or a one. The frequency signal SCANFREQ may refer to one of the bits in the register 502. If the identified bit is a zero, then there is not potential desensitization of signals of the first transceiver module 304 and the second transceiver module 330. If the identified bit is a one, then there is potential desensitization between signals of the first transceiver module 304 and the second transceiver module 330.

The second transceiver module 330 generates transmit request signal TX2, as shown at 558. The second coexistence interface 314 includes a delay module 508 and a scan frequency mask module 510. The delay module 508 generates an enable signal SCANON based on the frequency signal SCANFREQ and a predetermined amount of time after receiving the frequency signal SCANFREQ, as shown at 560. The predetermined amount of time may be provided by the first transceiver module 304. This predetermined amount of time may be transmitted directly from the first transceiver module 304 to the second coexistence interface 314 or indirectly via the host module 302. The enable signal SCANON indicates whether a scan is to be performed and/or whether a scan is being performed. The enable signal SCANON may also include the information in the frequency signal SCANFREQ. The enable signal SCANON is provided to the scan frequency mask module 510 and the coexistence arbitration module 326.

The scan frequency mask module 510 may fill and/or adjust bit values in the register 502 based on the configuration signal CONF. The scan frequency mask module 510 determines whether frequencies used by the first transceiver module 304 interfere with frequencies used by the second transceiver module 330 and generates an overlap signal OVLP, as shown at 562. The overlap signal OVLP is generated based on the enable signal SCANON, the configuration signal CONF, and contents of the register 502. The overlap signal OVLP indicates whether there is potential desensitization of signals of the first transceiver module 304 and the second transceiver module 330.

The coexistence arbitration module 326 arbitrates the signal TX1, SCANON based on the overlap signal OVLP, as shown at 564. The method may end at 566. If the overlap signal OVLP indicates that there is potential desensitization of frequencies and/or signals of the transceiver modules 304, 330, then the coexistence arbitration module 326 uses arbitration rules (as described above) to grant access to selected antennas. The arbitration rules may be used when the overlap signal OVLP is a one, a scan is active (i.e. to be performed or is being performed), and the second transceiver module 330 is requesting to transmit. If the implementation of FIG. 15 is performed for the third transceiver module 332, the coexistence arbitration module 326 may determine whether the frequencies of the first transceiver module 304 used for scanning interfere with BT channels used by the third transceiver module 332.

Figure 21:
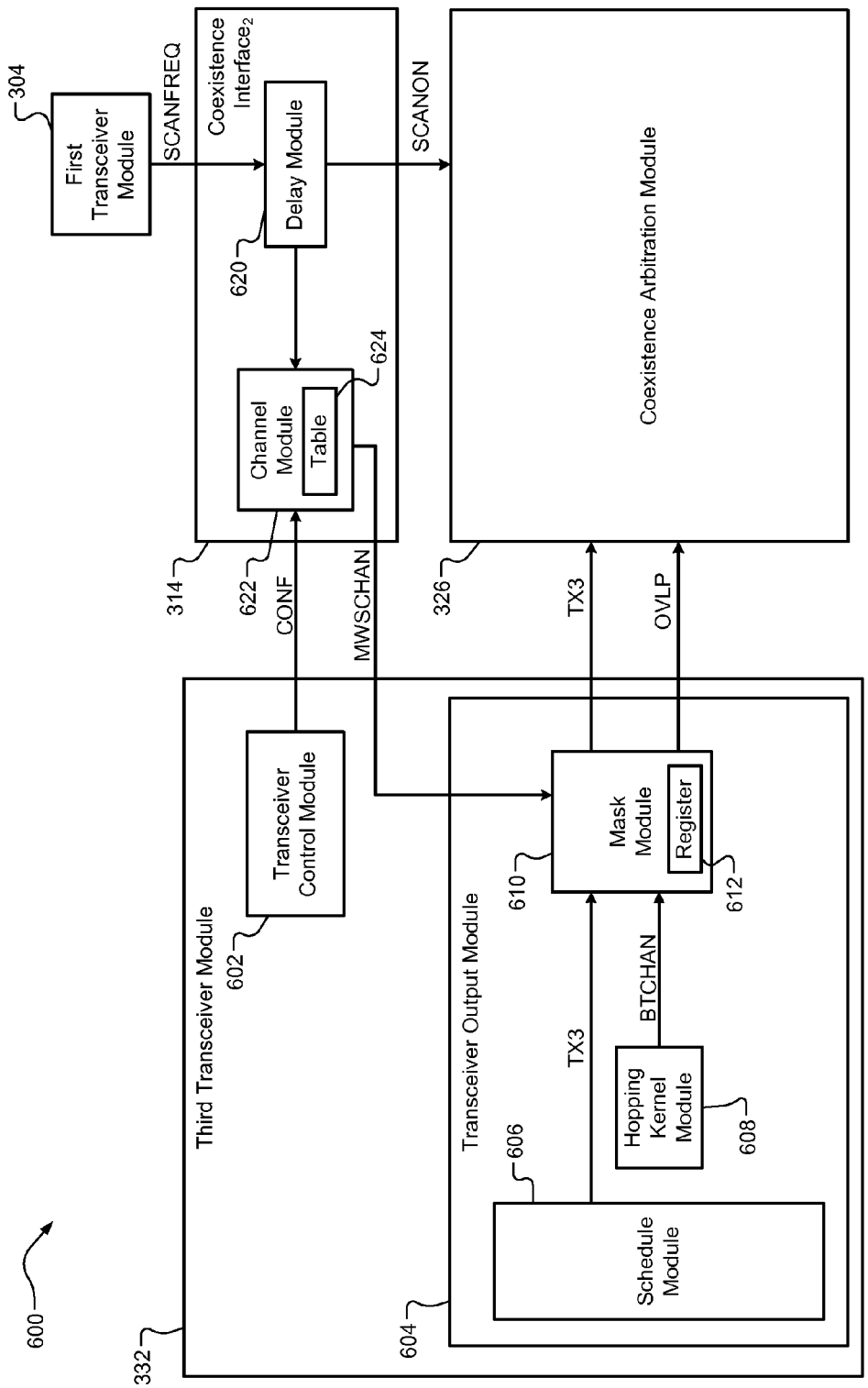
FIG. 21 is a functional block diagram of a portion of the coexistence system of FIG. 15 illustrating scan based arbitration for BT.
Figure 22:
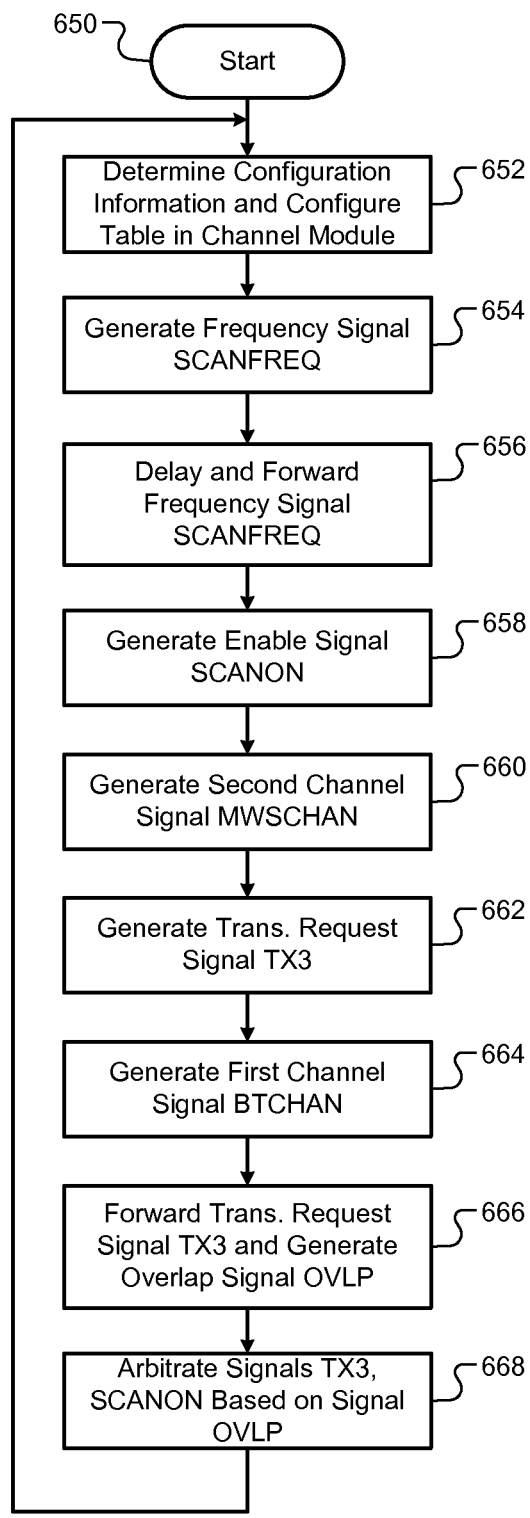
FIG. 22 illustrates a method of operating the portion of the coexistence system of FIG. 21.

Referring now to FIGS. 15, 21 and 22, a portion 600 of the coexistence system 300 of FIG. 15 illustrating scan based arbitration for BT and a corresponding operating method are shown. Although this method is described for performance of a scan, the method may be used for coexistence arbitration when transceivers are changing frequencies dynamically. The method may begin at 650. The implementation of FIGS. 21 and 22 is more efficient than the implementation of FIGS. 19 and 20 for transmission associated with the third transceiver module 332, as this implementation more effectively takes into account hopping channels (i.e. changing frequencies) of the third transceiver module 332. The portion 600 of the coexistence system 300 includes the first transceiver module 304, the third transceiver module 332, the second coexistence interface 314, and the coexistence arbitration module 326.

The third transceiver module 332 includes a transceiver control module 602 and a transceiver output module 604. The transceiver output module 604 includes a schedule module 606, a hopping kernel module 608 and a mask module 610. The second coexistence interface 614 includes a delay module 620 and a channel module 622. The channel module 622 may be in the transceiver output module 604 instead of being in the second coexistence interface 314.

The transceiver control module 602 generates the configuration signal CONF, as described with respect to FIG. 19, as shown at 652. The channel module 622 may configure a look-up table 624 based on the configuration signal CONF. The first transceiver module 304 generates the frequency signal SCANFREQ indicating a frequency on which the first transceiver module 304 is to perform a scan, as shown at 654.

The delay module 620 receives the frequency signal SCANFREQ and forwards the frequency signal SCANFREQ to the channel module 622 after a predetermined amount of time, as shown at 656. The predetermined amount of time may be determined by the first transceiver module 304 and provided to the second coexistence interface 314, as described above.

The delay module 620 may generate an enable signal SCANON based on the frequency signal SCANFREQ and may include the information in the frequency signal SCAN-FREQ, as shown at 658. The enable signal SCANON indicates whether a scan is to be performed and/or whether a scan is being performed. The enable signal SCANON is provided to the coexistence arbitration module 326.

The channel module 622 generates a second channel signal MWSCHAN, as shown at 660. The channel module 622 determines channels of the third transceiver module 332 that may be affected by transmitted and/or received signals of the first transceiver module 304 based on the configuration signal CONF and the frequency signal SCANFREQ. The channel module 622 generates the second channel signal MWSCHAN, which indicates the channels of the third transceiver module 332 may experience desensitization from signals of the first transceiver module 304. The look-up table 624 may be used to determine the affected channels. The channel module 622 may look up the value of the second channel signal MWSCHAN based on a value of the frequency signal SCANFREQ. The second channel signal MWSCHAN may indicate the affected channels and/or provide a channel and a direction bit as described above for the second mask signal MASK2. The table 624 can be either in the second coexistence interface 314 or in the third transceiver module 332.

The mask module 610 may include, for example, a register 612 that stores bit values based on the second channel signal MWSCHAN. The mask module 610 may compare the first channel signal BTCHAN with bits in the register 612 that are associated with the second channel signal MWSCHAN. The second channel signal MWSCHAN may refer to one or more bits (e.g., 3-bits) in the register 612. The register 612 may have any number of bits. If the one or more bits identified by the second channel signal MWSCHAN refer to a channel that may interfere with the channel indicated by the first channel signal BTCHAN, then the overlap signal OVLP is generated to have a one. If the one or more bits identified by the second channel signal MWSCHAN do not refer to a channel that may interfere with the channel indicated by the first channel signal BTCHAN, then the overlap signal OVLP is generated to have a zero. Channels and/or frequencies of the first transceiver module 304 and the third transceiver module 332 may be grouped into zones; each of the zones having multiple frequencies. The first channel signal BTCHAN, the second channel signal MWSCHAN, and/or the bits of the register 612 identified by the second channel signal MWSCHAN may refer to one or more of these zones.

The schedule module 606 generates the transmit request signal TX3, as shown at 662. The hopping kernel module 608 generates a first channel signal BTCHAN, as shown at 664. The mask module 610 forwards the transmit request signal TX3 to the coexistence arbitration module 326 and generates an overlap signal OVLP based on the transmit request signal TX3, the first channel signal BTCHAN, and a second channel signal MWSCHAN, as shown at 666.

The coexistence arbitration module 326 arbitrates the signals TX3, SCANON based on the overlap signal OVLP, as shown at 668. Task 652 may be performed after task 668. Arbitration rules may be used when the overlap signal is a one and/or indicates that there is potential desensitization of signals of the first transceiver module 304 and the signals of the third transceiver module 332.

While the above-disclosed coexistence systems may be operated using numerous methods, example methods are illustrated in FIGS. 11, 14, 16, 18, 20 and 22. Although the tasks of these methods are primarily described with respect to certain example implementations, the tasks may be easily modified to apply to other implementations of the present disclosure. The tasks of each of the methods may be iteratively performed. Also, the tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

Figure 23:
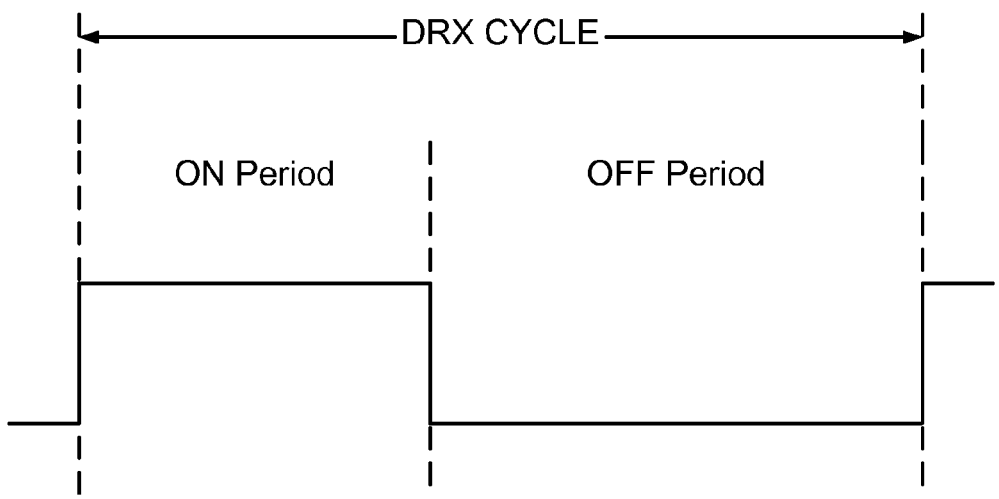
FIG. 23 is a timing diagram illustrating a discontinuous or data receive cycle.

In FIG. 23, a timing diagram illustrating a discontinuous or data receive (DRX) cycle is shown. A first transceiver module (e.g., one of the first transceiver modules 24, 206, 304 of FIGS. 1, 12, 13) may operate in a MWS DRX mode. The MWS DRX mode includes transitioning between ON and OFF periods of the DRX cycle. The first transceiver module may receive during the ON period and may and may be OFF during the OFF period.

Second and third transceiver modules (e.g., the second and third transceiver modules 32, 34, 208, 210, 330, 332 of FIGS. 1, 12 and 15) can schedule activities (e.g., transmit or receive signals) during the OFF period. A coexistence interface (e.g., the coexistence interface 314 of FIG. 15) may indicate timing of the ON and OFF periods to the second and third transceiver modules.

The second transceiver module may schedule, for example, transmission and/or reception of WLAN or WiFi signals during the OFF period. At the beginning of the OFF period a station may send (i) a PS-Poll with or without data to an AP, or (ii) a U-APSD trigger frame to the AP. The station can transition to a sleep (or power save) mode at an end of the OFF period. The station may indicate to the AP that the station is to transition to a power save mode at an end of the OFF period. The AP may transmit a NoA signal to stations in a network of the AP at the end of the OFF period.

The third transceiver module may schedule, for example, Bluetooth traffic during the OFF period for paging, inquiry, page scanning, and inquiry scan operations. The third transceiver module may alternatively or in addition schedule transmission and/or reception of asynchronous connection-oriented logical (ACL) transport data and/or enhanced synchronous connection-oriented (eSCO) data during the OFF period. ACL transport data may refer to data packets transmitted on an ACL link. The ACL link may be used in a polling time division multiplexing access (TDMA) technique to arbitrate between devices access to the ACL link. ACL transport data may be. The enhanced synchronous connection-oriented (eSCO) data may refer to voice data that is transmitted on a corresponding link. An SCO link is a set of reserved timeslots on an existing ACL link. Each device transmits encoded voice data in the reserved timeslot.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

Although the terms first, second, third, etc. may be used herein to describe various modules, signals, antennas, elements, and/or components, these items should not be limited by these terms. These terms may be arbitrary and are only used to distinguish one item from another item. Terms such as "first," "second," and other numerical terms when used herein do not imply a sequence or order unless clearly indicated by the context. Thus, a first item discussed herein could be termed a second item without departing from the teachings of the example implementations. As an example and in the claims, the term "second transceiver module" may refer to any one of the above disclosed second transceiver modules or third transceiver modules.

What is claimed is:

1. A coexistence system comprising:
   a first transceiver module, in a first network device, configured to generate at least one first request signal, wherein the first transceiver module operates according to a first wireless communication standard, and wherein the at least one first request signal requests transmission or reception for the first transceiver module;
   an interface configured to generate a first priority signal based on the at least one first request signal, wherein the first priority signal indicates a first priority level of first data signals corresponding to the at least one first request signal;
   a second transceiver module, in the first network device, configured to (i) generate at least one second request signal, and (ii) generate a second priority signal, wherein the second transceiver module operates according to a second wireless communication standard, wherein the at least one second request signal requests transmission or reception for the second transceiver module, and wherein the second priority signal indicates a second priority level of second data signals corresponding to the at least one second request signal,
   wherein
      the first transceiver module is configured to generate a status signal,
      the status signal indicates (i) a frequency on which the first transceiver module is transmitting, (ii) whether the first transceiver module is performing a scan, or (iii) a priority level of a signal to be transmitted to or received by the first transceiver module, and
      the second transceiver module is configured to, based on the status signal, generate a first overlap signal, wherein the first overlap signal indicates whether (i) the transmission or reception of the first transceiver module is capable of desensitizing the second transceiver module with respect to the second data signals, or (ii) the transmission or reception of the second transceiver module is capable of desensitizing the first transceiver module with respect to the first data signals; and
   an arbitration module configured to (i) based on the first priority level, the second priority level, and the first overlap signal, arbitrate the at least one first request signal and the at least one second request signal, and (ii) based on the arbitration of the at least one first request signal and the at least one second request signal, selectively connect antennas to the first transceiver module and the second transceiver module in one of a plurality of configurations.

2. The coexistence system of claim 1, further comprising a third transceiver module configured to generate (i) at least one third request signal, and (ii) a third priority signal, wherein:
   the third transceiver module is configured to operate according to a third wireless standard;
   the at least one third request signal requests transmission or reception for the third transceiver module;
   the third priority signal indicates a third priority level of third data signal corresponding to the at least one third request signal; and
   the arbitration module is configured to (i) based on the third priority level, arbitrate the at least one first request signal, the at least one second request signal, and the at least one third request signal, and (ii) based on the arbitration of the at least one first request signal, the at least one second request signal, and the at least one third request signal, selectively connect the first transceiver module, the second transceiver module, and the third transceiver module to the antennas in one of the plurality of configurations.

3. The coexistence system of claim 1, further comprising a third transceiver module configured to generate (i) at least one third request signal, (ii) a third priority signal, and (iii) a second overlap signal, wherein:
   the third transceiver module is configured to operate according to a third wireless standard;

the at least one third request signal requests permission for the third transceiver module to transmit or receive;

the third priority signal indicates a third priority level of third data signal corresponding to the at least one third request signal;

the second overlap signal indicates whether (i) the transmission or reception of the first transceiver module or the second transceiver module is capable of desensitizing the third transceiver module with respect to the third data signals, or (ii) the transmission or reception of the second transceiver module or the third transceiver module is capable of desensitizing the first transceiver module with respect to the first data signals; and the arbitration module is configured to (i) based on the third priority level and the second overlap signal, arbitrate the at least one first request signal, the at least one second request signal, and the at least one third request signal, and (ii) based on the arbitration of the at least one first request signal, the at least one second request signal, and the at least one third request signal, selectively connect the first transceiver module, the second transceiver module, and the third transceiver module to the antennas in one of the plurality of configurations.

4. The coexistence system of claim 1, wherein:
the first transceiver module is configured to transmit first data signals to or receive the first data signals from a second network device via the antennas; and
the second transceiver module is configured to transmit second data signals to or receive the second data signals from the second network device via the antennas.

5. The coexistence system of claim 1, wherein the interface is connected between the first transceiver module and the arbitration module.

6. The coexistence system of claim 1, wherein, based on the arbitration of the at least one first request signal and the at least one second request signal:
the first transceiver module transmits or receives the first data signals via the antennas; and
the second transceiver module transmits or receives the second data signals via the antennas.

7. The coexistence system of claim 1, wherein:
the first transceiver module is configured to generate a first status signal indicating a status of the first transceiver module;
the second transceiver module is configured to generate a first configuration signal based on the first status signal; and
the interface comprises a first register module, wherein the first register module is configured to generate the first priority signal based on (i) the at least one first request signal, and (ii) the first configuration signal.

8. The coexistence system of claim 7, wherein:
the interface comprises a scan register module;
the scan register module is configured to generate a third priority signal;
the third priority signal indicates a priority level of a scan being performed by the first transceiver module; and
the arbitration module is configured to, based on the third priority signal, arbitrate the at least one first request signal and the at least one second request signal.

9. The coexistence system of claim 8, wherein:
the first transceiver module is configured to generate a first scan signal indicating a frequency of the first data signals;
the interface comprises a second scan module, wherein the second scan module is configured to generate a second scan signal based on the first scan signal, and wherein the second scan signal indicates the first transceiver module is to perform a scan; and
the interface is configured to generate the third priority signal based on the second scan signal.

10. The coexistence system of claim 9, wherein:
the scan register module is configured to generate a third scan signal based on the second scan signal; and
the arbitration module is configured to, based on the third scan signal, arbitrate the at least one first request signal and the at least one second request signal.

11. The coexistence system of claim 1, wherein the status signal indicates (i) a frequency on which the first transceiver module is transmitting, (ii) whether the first transceiver module is performing a scan, and (iii) a priority level of the signal to be transmitted to or received by the first transceiver module.

12. The coexistence system of claim 1, wherein the interface comprises:
a register module configured to (i) receive a first configuration signal from the second transceiver module and the at least one first request signal, and (ii) based on the first configuration signal and the at least one first request signal, generate the first priority signal;
a scan enable module configured to (i) receive a first scan signal from the first transceiver module, and (ii) generate a scan enable signal based on the first scan signal, wherein the first scan signal requests that a scan be performed; and
a scan register module configured to (i) receive a second configuration signal from the second transceiver module and the scan enable signal, and (ii) based on the second configuration signal and the scan enable signal, generate a second scan signal and third priority signal, wherein the second scan signal indicates whether a scan is to be performed, and wherein the third priority signal indicates a priority level for the scan to be performed.

13. A method comprising:
generating at least one first request signal via a first transceiver module in a network device, wherein the first transceiver module operates according to a first wireless communication standard, and wherein the at least one first request signal requests transmission or reception for the first transceiver module;
generating, via an interface, a first priority signal based on the at least one first request signal, wherein the first priority signal indicates a first priority level of first data signals corresponding to the at least one first request signal;
generating at least one second request signal and a second priority signal via a second transceiver module, wherein the second transceiver module is in the network device and operates according to a second wireless communication standard, wherein the at least one second request signal requests transmission or reception for the second transceiver module, and wherein the second priority signal indicates a second priority level of second data signals corresponding to the at least one second request signal;
generating a status signal at the first transceiver module, the status signal indicates (i) a frequency on which the first transceiver module is transmitting, (ii) whether the first transceiver module is performing a scan, or (iii) a priority level of a signal to be transmitted to or received by the first transceiver module;
based on the status signal, generating at the second transceiver module a first overlap signal, wherein the first overlap signal indicates whether (i) the transmission or reception of the first transceiver module is capable of desensitizing the second transceiver module with respect to the second data signals, or (ii) the transmission or reception of the second transceiver module is capable of desensitizing the first transceiver module with respect to the first data signals;

based on the first priority level, the second priority level, and the first overlap signal, arbitrating the at least one first request signal and the at least one second request signal; and based on the arbitration of the at least one first request signal and the at least one second request signal, selectively connect antennas to the first transceiver module and the second transceiver module in one of a plurality of configurations.

14. The method of claim 13, further comprising:

generating, via a third transceiver module, (i) at least one third request signal, and (ii) a third priority signal, wherein the at least one third request signal request permission for the third transceiver module to transmit or receive, and wherein the third priority signal indicates a third priority level of third data signal corresponding to the at least one third request signal; and operating the third transceiver module according to a third wireless standard; and based on the third priority level, arbitrating the at least one first request signal, the at least one second request signal, and the at least one third request signal; and based on the arbitration of the at least one first request signal, the at least one second request signal, and the at least one third request signal, selectively connecting the first transceiver module, the second transceiver module, and the third transceiver module to the antennas in one of the plurality of configurations.

15. The method of claim 13, further comprising:

generating, via a third transceiver module, (i) at least one third request signal, (ii) a third priority signal, and (iii) a second overlap signal, wherein the at least one third request signal requests permission for the third transceiver module to transmit or receive, wherein the third priority signal indicates a third priority level of third data signal corresponding to the at least one third request signal, and wherein the second overlap signal indicates whether (i) the transmission or reception of the first transceiver module or the second transceiver module is capable of desensitizing the third transceiver module with respect to the third data signals, or (ii) the transmission or reception of the second transceiver module or the third transceiver module is capable of desensitizing the first transceiver module with respect to the first data signals;

operating the third transceiver module according to a third wireless standard;

based on the third priority level and the second overlap signal, arbitrating the at least one first request signal, the at least one second request signal, and the at least one third request signal; and based on the arbitration of the at least one first request signal, the at least one second request signal, and the at least one third request signal, selectively connecting the first transceiver module, the second transceiver module, and the third transceiver module to the antennas in one of the plurality of configurations.

16. The method of claim 13, wherein:

transmitting, via the first transceiver module, first data signals to or receiving the first data signals from a second network device via the antennas; and transmitting, via the second transceiver module, second data signals to or receiving the second data signals from the second network device via the antennas.

17. The method of claim 13, further comprising, based on the arbitration of the at least one first request signal and the at least one second request signal:

transmitting or receiving the first data signals via the antennas at the first transceiver module; and transmitting or receiving the second data signals via the antennas at the second transceiver module.

18. The method of claim 13, further comprising:

generating, via the first transceiver module, a first status signal indicating a status of the first transceiver module;

generating, via the second transceiver module, a first configuration signal based on the first status signal;

generating the first priority signal based on (i) the at least one first request signal, and (ii) the first configuration signal;

generating a third priority signal, wherein the third priority signal indicates a priority level of a scan being performed by the first transceiver module; and based on the third priority signal, arbitrating the at least one first request signal and the at least one second request signal.

19. The method of claim 18, further comprising:

generating, via the first transceiver module, a first scan signal indicating a frequency of the first data signals;

generating a second scan signal based on the first scan signal, wherein the second scan signal indicates the first transceiver module is to perform a scan; and generating the third priority signal based on the second scan signal.

20. The method of claim 19, further comprising:

generating a third scan signal based on the second scan signal; and based on the third scan signal, arbitrating the at least one first request signal and the at least one second request signal.

* * * * *